United States Patent
Lewin et al.

(10) Patent No.: US 9,684,434 B2
(45) Date of Patent: *Jun. 20, 2017

(54) SYSTEM AND METHOD FOR DISPLAYING A USER INTERFACE ACROSS MULTIPLE ELECTRONIC DEVICES

(71) Applicant: BLACKBERRY LIMITED, Waterloo (CA)

(72) Inventors: Mathias Lewin, Helsingborg (SE); Dan Zacharias Gardenfors, Malmo (SE); Marcus Eriksson, Malmo (SE)

(73) Assignee: BlackBerry Limited, Waterloo, Ontario (CA)

( * ) Notice: Subject to any disclaimer, the term of this patent is extended or adjusted under 35 U.S.C. 154(b) by 254 days.

This patent is subject to a terminal disclaimer.

(21) Appl. No.: 14/315,009

(22) Filed: Jun. 25, 2014

(65) Prior Publication Data

US 2014/0310611 A1    Oct. 16, 2014

Related U.S. Application Data

(63) Continuation of application No. 13/401,564, filed on Feb. 21, 2012, now Pat. No. 8,786,517.

(51) Int. Cl.
G06F 3/14      (2006.01)
G06F 3/0484    (2013.01)
G09G 5/12      (2006.01)

(52) U.S. Cl.
CPC .......... *G06F 3/0484* (2013.01); *G06F 3/1446* (2013.01); *G09G 5/12* (2013.01);
(Continued)

(58) Field of Classification Search
CPC .................................................. G06F 3/1446
See application file for complete search history.

(56) References Cited

U.S. PATENT DOCUMENTS

| 5,838,914 A | 11/1998 | Carleton et al. |
| 7,441,200 B2 | 10/2008 | Savage |

(Continued)

FOREIGN PATENT DOCUMENTS

| EP | 1271286 | 1/2003 |
| EP | 1271289 | 1/2003 |

(Continued)

OTHER PUBLICATIONS

International Search report mailed Jul. 12, 2013; in corresponding PCT patent application No. PCT/CA2013/050086.

(Continued)

*Primary Examiner* — William Bashore
*Assistant Examiner* — Nathan Shrewsbury
(74) *Attorney, Agent, or Firm* — Thomas Grzesik; Fleit Gibbons Gutman Bongini & Bianco P.L.

(57) ABSTRACT

A system and method are provided for displaying a user interface using multiple electronic devices. The method comprises providing a first user interface framework on a first electronic device having a first display screen; the first user interface framework determining that a second display screen on a second electronic device is available via a connection between the first and second electronic devices; the first user interface framework using application logic from an application on the first mobile device to determine a first user interface portion to be displayed on the first display screen and a second user interface portion to be displayed on the second display screen; and the first user interface framework providing data associated with the second user interface portion to the second electronic device.

19 Claims, 14 Drawing Sheets

(52) U.S. Cl.
CPC ... *G09G 2356/00* (2013.01); *G09G 2370/022* (2013.01); *G09G 2370/06* (2013.01)

(56) References Cited

U.S. PATENT DOCUMENTS

| | | | |
|---|---|---|---|
| 7,511,682 | B2 | 3/2009 | Fuller et al. |
| 7,532,196 | B2 * | 5/2009 | Hinckley ................ G06F 3/011 345/156 |
| 7,577,912 | B2 | 8/2009 | Govindan et al. |
| 7,634,780 | B2 | 12/2009 | Rhoten et al. |
| 7,865,468 | B2 | 1/2011 | Naineni |
| 8,253,649 | B2 * | 8/2012 | Imai ........................ G06F 3/011 345/1.3 |
| 8,269,691 | B2 * | 9/2012 | Watson ................. G06F 3/1446 345/1.1 |
| 8,610,641 | B2 * | 12/2013 | Hutchinson ............ G09B 5/067 345/1.1 |
| 8,823,640 | B1 * | 9/2014 | Harris .................... G06F 3/1438 345/156 |
| 8,909,299 | B2 * | 12/2014 | Mercuri .................. H04M 3/42 345/1.1 |
| 9,052,760 | B2 * | 6/2015 | Locker .................... G06F 3/041 |
| 9,213,480 | B2 * | 12/2015 | Keranen ............. G06F 3/04883 |
| 9,268,518 | B2 * | 2/2016 | Reeves ..................... G09G 5/14 |
| 9,298,362 | B2 * | 3/2016 | Lucero ............... H04N 21/4788 |
| 9,318,043 | B2 * | 4/2016 | Chang .................. G09G 3/2092 |
| 2003/0090517 | A1 | 5/2003 | Anderson et al. |
| 2004/0163046 | A1 | 8/2004 | Chu et al. |
| 2005/0168399 | A1 * | 8/2005 | Palmquist ............. G06F 1/1601 345/1.1 |
| 2006/0001593 | A1 | 1/2006 | Baudisch |
| 2006/0088277 | A1 | 4/2006 | Lee |
| 2006/0116164 | A1 | 6/2006 | Kang |
| 2006/0259866 | A1 | 11/2006 | Prasad et al. |
| 2007/0124503 | A1 | 5/2007 | Ramos et al. |
| 2007/0242061 | A1 | 10/2007 | Rhoten et al. |
| 2007/0296643 | A1 | 12/2007 | Ben-Shachar et al. |
| 2008/0256468 | A1 | 10/2008 | Peters et al. |
| 2009/0029690 | A1 | 1/2009 | Levien et al. |
| 2009/0055758 | A1 | 2/2009 | Sim et al. |
| 2009/0125634 | A1 | 5/2009 | Virdi et al. |
| 2009/0160731 | A1 * | 6/2009 | Schuler ................. G06F 3/1423 345/1.1 |
| 2009/0193351 | A1 | 7/2009 | Lee et al. |
| 2009/0273560 | A1 * | 11/2009 | Kalanithi ................ G06F 3/002 345/156 |
| 2010/0060549 | A1 | 3/2010 | Tsern |
| 2010/0060572 | A1 | 3/2010 | Tsern |
| 2010/0064228 | A1 | 3/2010 | Tsern |
| 2010/0235523 | A1 | 9/2010 | Garcia et al. |
| 2010/0325559 | A1 * | 12/2010 | Westerinen ............ G06Q 10/10 715/753 |
| 2011/0025706 | A1 | 2/2011 | Etelapera |
| 2011/0040718 | A1 | 2/2011 | Tendjoukian et al. |
| 2011/0126231 | A1 | 5/2011 | Ko |
| 2011/0183654 | A1 | 7/2011 | Lanier et al. |
| 2011/0197147 | A1 | 8/2011 | Fai |
| 2011/0230178 | A1 | 9/2011 | Jones et al. |
| 2011/0252317 | A1 | 10/2011 | Keraenen et al. |
| 2012/0062475 | A1 * | 3/2012 | Locker .................... G06F 3/041 345/173 |
| 2012/0206319 | A1 * | 8/2012 | Lucero ............... H04N 21/4788 345/1.3 |
| 2012/0331200 | A1 * | 12/2012 | Smith ................... G06F 1/1632 710/303 |
| 2013/0194374 | A1 | 8/2013 | Kieft et al. |
| 2013/0219303 | A1 * | 8/2013 | Eriksson ............... G06F 3/1454 715/759 |
| 2014/0009366 | A1 * | 1/2014 | Chang .................. G09G 3/2092 345/1.1 |
| 2014/0302773 | A1 * | 10/2014 | Jantunen ............... H04W 8/005 455/3.01 |
| 2015/0338943 | A1 * | 11/2015 | Donnelly ................ G06F 3/041 345/173 |
| 2016/0007417 | A1 * | 1/2016 | Gao ................... H05B 33/0815 315/219 |

FOREIGN PATENT DOCUMENTS

| | | |
|---|---|---|
| EP | 1868078 | 12/2007 |
| EP | 2239921 | 10/2010 |
| EP | 2337300 | 6/2011 |
| EP | 2385689 | 11/2011 |
| WO | 2005071530 | 8/2005 |
| WO | 2006043977 | 4/2006 |

OTHER PUBLICATIONS

Extended European Search Report mailed Jul. 20, 2012; in corresponding European patent application No. 12156348.0.
Extended European Search Report mailed Jul. 12, 2012; in corresponding European patent application No. 12156380.3.
Air Display; http://avatron.com/apps/air-display; Avatron; retrieved online Oct. 15, 2011.
iDisplay for Android; http://www.shapeservices.com/en/products/details.php?product=idisplay&platform=android; retrieved online Oct. 15, 2011.
LiveView Press Release; http://www.sonyericsson.com/cws/companyandpressreleases/pressrelease/pressreleaseoverview/liveviewpressreleasefinal-20100928?cc=gb&lc=en; Sep. 28, 2010; Sony Ericsson; retrieved online Oct. 15, 2011.
MaxiVista v4—Manual; http://www.maxivista.com/docs4/09/manual.htm; retrieved online Oct. 15, 2011.
PC Remote Controller—Android Market; https://market.android.com/details?id=com.silicmobile.pcremotecontroller&hl=en; retrieved online Oct. 15, 2011.
Gilliland, A.; Pixel Proliferation: A Toolset for Managing Screen Resolutions | A Punchcut Perspective; Apr. 1, 2011; http://punchcut.com/perspectives/expanding-universe-toolset-managing-screen-resolutions; retrieved online Feb. 23, 2012.
Murphy, M.; Handling Multiple Screen Sizes, Part Two; Feb. 18, 2010; http://www.androidguys.com/2010/02/18/handling-multiple-screen-sizes-part-2/; retrieved online Mar. 23, 2012.
Meskens, J.; Tool Support for Designing, Managing and Optimizing Multi-Device User Interfaces; PhD. Thesis, Abstract; 2011; Maastricht University; 2011.
International Search Report mailed Mar. 28, 2013; in corresponding PCT patent application No. PCT/CA2013/050132.
Canadian Office Action dated Jan. 6, 2017, received for Canadian Application No. 2,806,906.

* cited by examiner

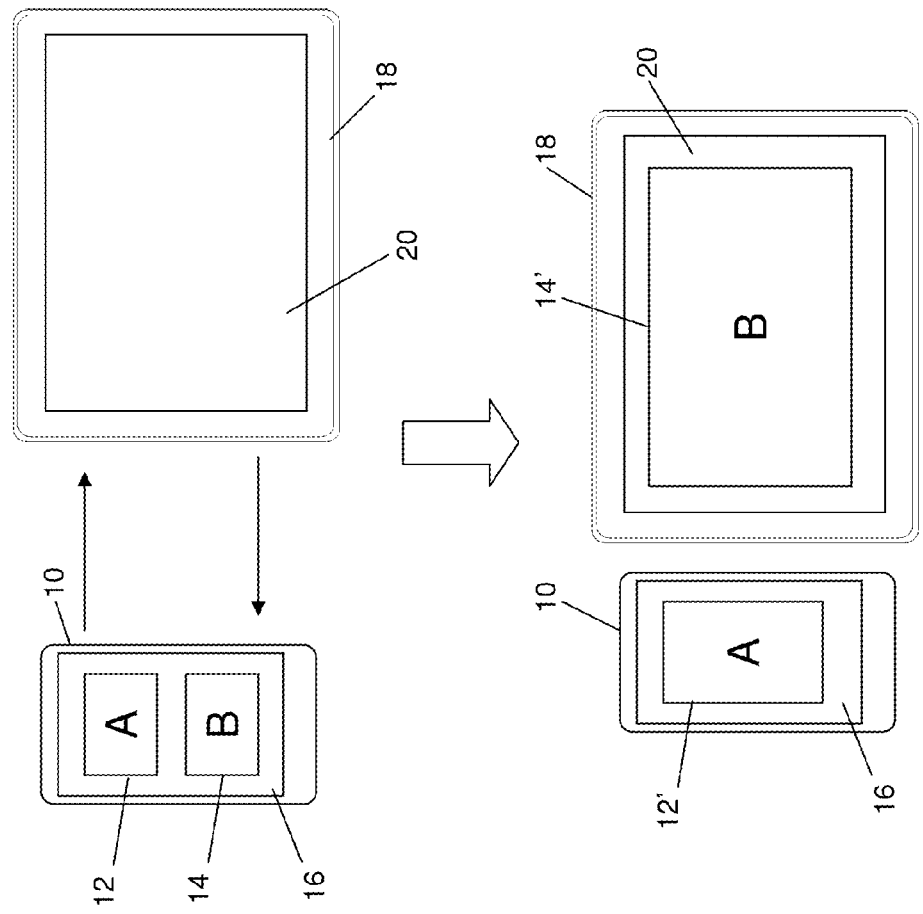
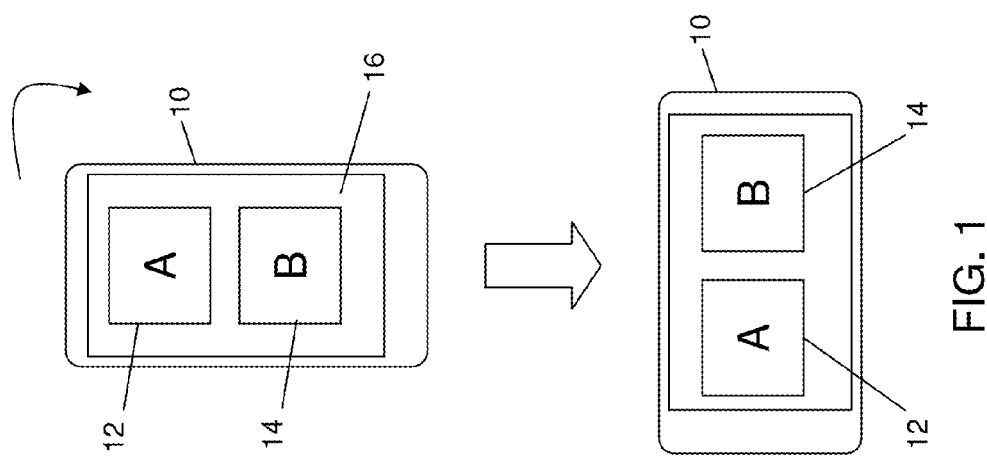
FIG. 2
FIG. 1

SYSTEM AND METHOD FOR DISPLAYING A USER INTERFACE ACROSS MULTIPLE ELECTRONIC DEVICES

CROSS-REFERENCE TO RELATED APPLICATIONS

The present application is a continuation of U.S. patent application Ser. No. 13/401,564 filed Feb. 21, 2012 incorporated herein by reference.

TECHNICAL FIELD

The following relates to systems and methods for displaying user interfaces across multiple electronic devices.

DESCRIPTION OF THE RELATED ART

The incorporation of near field or "short range" communication technologies into portable, handheld, or otherwise "mobile" electronic devices has made sharing data between such devices more convenient. Devices may now routinely pair or tether with each other for enabling both interactions between users and to facilitate the use of multiple devices by the same user.

Interactions between paired devices that extend beyond basic capabilities such as file transfer often require custom low-level programming by an application developer and thus the quality and extent of functionality made available to the user is dictated by the application developer. When such low level programming is significant, application developers may be discouraged with incorporating cross-device functionality.

BRIEF DESCRIPTION OF THE DRAWINGS

Embodiments will now be described by way of example only with reference to the appended drawings wherein:

FIG. 1 is a plan view of a mobile device in first and second orientations;

FIG. 2 is a plan view of a pair of mobile devices nearing each other and displaying a shared user interface (UI);

DETAILED DESCRIPTION

Figure 3:
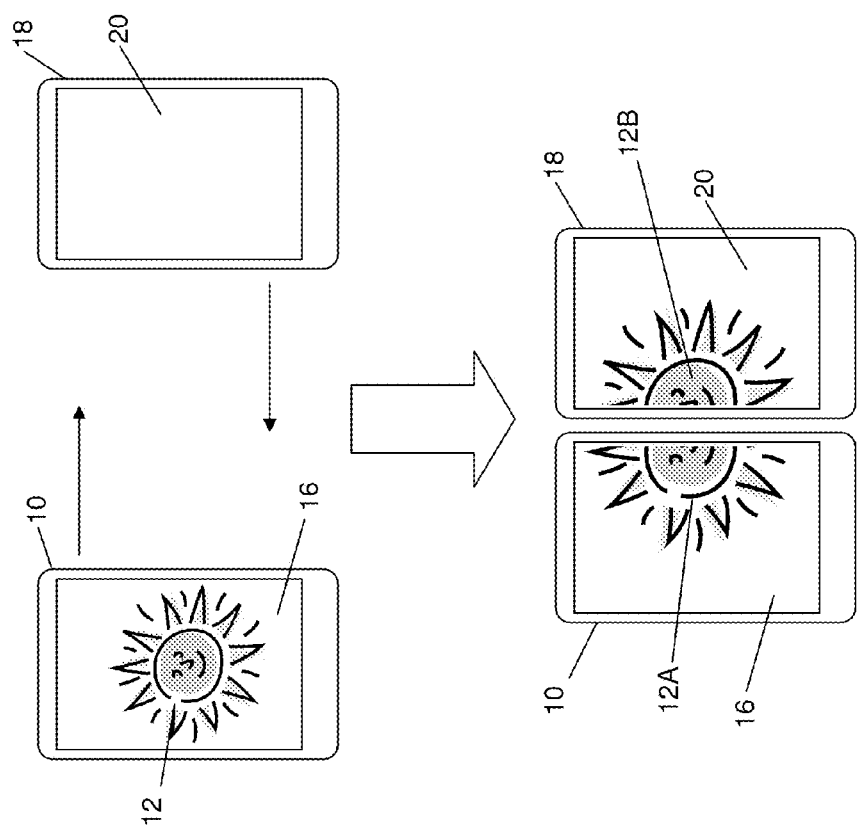
FIG. 3 is a plan view of a pair of mobile devices nearing each other and displaying a shared UI.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It has been found that the low-level programming required to distribute a UI over multiple display screens on multiple devices, can be minimized by allowing a UI framework to abstract the management and handling of combined virtual and physical screen spaces from code written by an application developer. By abstracting the management and handling of the combined virtual and physical screen spaces, application developers can automatically benefit from screen space provided by an interconnected device, when available, without having to expend a significant amount of development resources in low-level programming. In this way, an application can be developed without having to account for different screen sizes, form factors, and device functionality. Instead, the UI framework enables application logic as written by the application developer, to be rendered according to the total screen space available at that time, whether utilizing a single screen or multiple screens.

Moreover, the UI framework described herein handles the virtual combined screen space transparently to one or both of the application developer and application programming interface (API) such that from the application's perspective, there appears to be no difference between the distribution of UI elements when utilizing a single mobile device screen or utilizing multiple mobile device screens, thus enabling an application to be dynamically adapted to changing environments and corresponding changes in the virtual screen space available to the application.

FIG. 1 illustrates a first mobile device 10 that includes a display screen 16. The screen 16 in the example shown in FIG. 1 displays a first UI element 12 (A) and a second UI element 14 (B) and illustrates the rotation of the mobile device 10 from a portrait orientation (with respect to the page) to a landscape orientation, and the rearrangement of the first and second UI elements 12, 14 after rotation. When programming an application including the first and second UI elements 12, 14, the application developer has the ability to define how the first and second UI elements 12, 14 are rearranged when such a rotation occurs. For example, UI elements that include text may themselves require rotation to ensure readability of the text in the new position. In another example, the first and second UI elements 12, 14 may need to be rearranged from a top/bottom relative orientation to a side/side orientation (e.g., as shown in FIG. 1). By enabling the application UI to be rearranged in this way, the application can maintain usability in both orientations.

The application displaying the first and second UI elements 12, 14 may also benefit from an enlarged screen space afforded by the utilization of a second display screen 20 on a paired or otherwise nearby mobile device 18, as shown in FIG. 2. Once the two mobile devices 10, 18 are paired, near each other, or paired and near each other the first and second UI elements 12, 14 may be rearranged to enable an enlarged first UI element 12' to occupy the first screen 16, and an enlarged second UI element 14' to occupy the second screen 20. In this way, a rearrangement similar to what is shown in FIG. 1 can be distributed over multiple screens 16, 20, and the increase in virtual screen space allows for further enhancements, namely the enlargement of the first and second UI elements 12, 14 to take advantage of the different form factors. By abstracting the management and handling of the combined/virtual screen space using a UI framework as explained below, the application developer would not need to account for various different form factors and orientations of the connected devices thus reducing the low-level programming required. Instead, the UI framework transparently determines the screen space available to the application, and can distribute UI elements according to application logic that is device agnostic. For example, the application developer may specify that the first and second UI elements 12, 14 are to be rearranged in a side-by-side configuration when a single device is rotated and distributed in a side-by-side arrangement across multiple screens, when a second screen is available, wherein each element is resized to maximize its appearance within the screen on which it is displayed.

FIG. 3 illustrates another example, wherein the first and second mobile devices 10, 18 include similar form factors and maintain portrait orientations as they are paired and near each other. In the example shown in FIG. 3, the increased screen space of the virtual screen enables the first UI element 12 to be enlarged across both screens 16, 20 such that one portion 12A is displayed on the first screen 16, and another portion 12B is displayed on the second screen 20. As will be explained in greater detail below, having the UI framework in the scenario shown in FIG. 3 obtain and render the UI element 12 for the application through a client-server rendering configuration (see also FIGS. 5 and 6) allows the UI framework to determine that multiple screens 16, 20 are available and either automatically, or according to specific application logic, modify the UI element 12 to take full advantage of the increased screen space.

It can be appreciated that although the examples shown in FIGS. 1 to 3, and those examples provided below, illustrate virtual combined screens distributed over pairs of portable and handheld-type mobile devices 10 such as smart phones, tablet computers, portable gaming systems, etc.; the principles discussed herein equally apply to configurations wherein at least one of the paired devices 10, 18 is non-portable, stationary, incorporated into a larger system, etc. For example, one of the paired devices 10, 18 may include an in-vehicle infotainment screen, a public kiosk or digital signage screen, home television, etc. As such, the principles discussed herein may be applied to any electronic devices having respective display screens and being communicable with each other.

It can also be appreciated that although the examples described herein include a short-range communication connection between the devices providing the shared screen space, various other pairing methods may be used. For example, pairing could also be accomplished with mechanisms that incorporate computer vision, acoustics, other sensors, etc. Moreover, any such pairing methods may operate in a standalone configuration or combined with communication channels such as wlan, wi-fi, mobile networks, etc.

Figure 4:
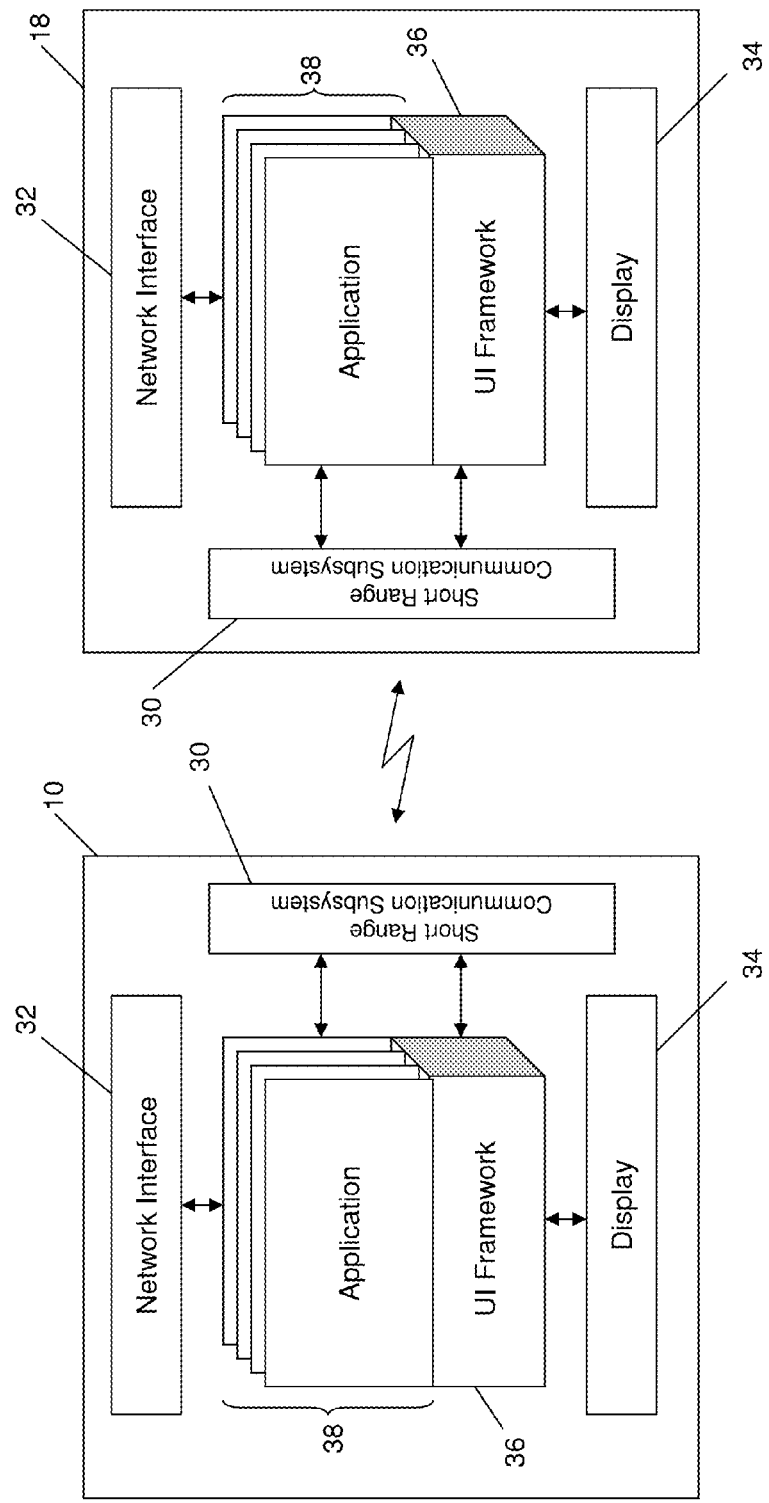
FIG. 4 is a block diagram of first and second mobile devices paired over a short range communication connection.

FIG. 4 illustrates example configurations for the first and second mobile devices 10, 18. As can be seen in FIG. 4, the first and second mobile devices 10, 18, in this example, have similar configurations. However, it can be appreciated that the configurations of the devices paired and sharing a virtual/combined display screen may have different configurations from one another and from the configuration shown in FIG. 4. For example, the functionality described herein may be incorporated into different application or operating system code, or other modules or components of the connected devices. Therefore, it can be appreciated that the configuration shown in FIG. 4 is for illustrative purposes only.

The mobile devices 10, 18 each include a short range communication subsystem 30 for enabling near field or short range communication channels or connections to be established between the first mobile device 10 and the second mobile device 18. The short range communication subsystem 30 may be operable to communicate via any suitable short range communication or near-field communication protocol, such as Bluetooth, infrared, etc. As noted above, pairing between the devices 10, 18 may also be accomplished using other methods and via the short-range communication subsystem 30 is only one illustrative example. The first and second mobile devices 10, 18 also include a network interface 32 for enabling the first and second mobile devices 10, 18 to communicate via a network, e.g., over Ethernet, Wi-Fi, cellular, etc. A display module 34 is also included, which may represent any interface, programming code, module, or component that enables UI elements to be rendered on the respective display screens 16, 20. A UI framework 36 is provided for handling UI operations and decisions on behalf of at least one application 38. As shown in FIG. 4, the UI framework 36 may support multiple applications 36. The UI framework 36 operates according to application logic to obtain or otherwise handle UI elements for the applications 36 and render those UI elements on the display screen 16, 20 via the display module 34. Although not shown in FIG. 4, the UI frameworks 36 may also communicate via the respective network interfaces 32, e.g., when pairing over a mobile network.

Further detail regarding a configuration for the UI framework 36 will now be described, making reference to FIGS. 5 and 6.

UIs may be generally visualized as a graphical scene comprising elements or objects (also referred to as entities). Data structures known as scene graphs may be used to define the logical or spatial representation or both the logical and spatial representation of a graphical scene. A scene graph is a collection of nodes in a graph or tree structure. The elements or objects of a UI may be represented as nodes in the scene graph. A node in a scene graph may have many children. The parent node of a scene graph that does not itself have a parent node corresponds to the overall UI.

Consequently, an effect applied to a parent is applied to all its child nodes, i.e., an operation performed on the parent of a group (related by a common parent) automatically propagates to all of its child nodes. For example, related objects/entities may be grouped into a compound object (also known as a layout), which may by moved, transformed, selected, etc., as a single group. In general, a layout can be any grouping of UI elements or objects. The term "container" as used herein refers to layouts that group UI elements in a particular ordered manner. A parent node can have one or more child nodes that can be, for example, any type of layout including a container. Each container can in turn have its own child nodes, which may be, for example, other container nodes, basic UI elements or special effect nodes. The basic UI elements correspond to discrete components of the UI such as, for example, a button or a slider. A leaf node in a scene graph corresponds to a basic UI element. A leaf node does not have any child nodes.

As mentioned above, containers are layouts that group interface elements in a particular ordered manner. Containers can be of various types, including but not limited to, docking containers, stacking containers, grid-based containers, and scrolling containers.

Figure 5:
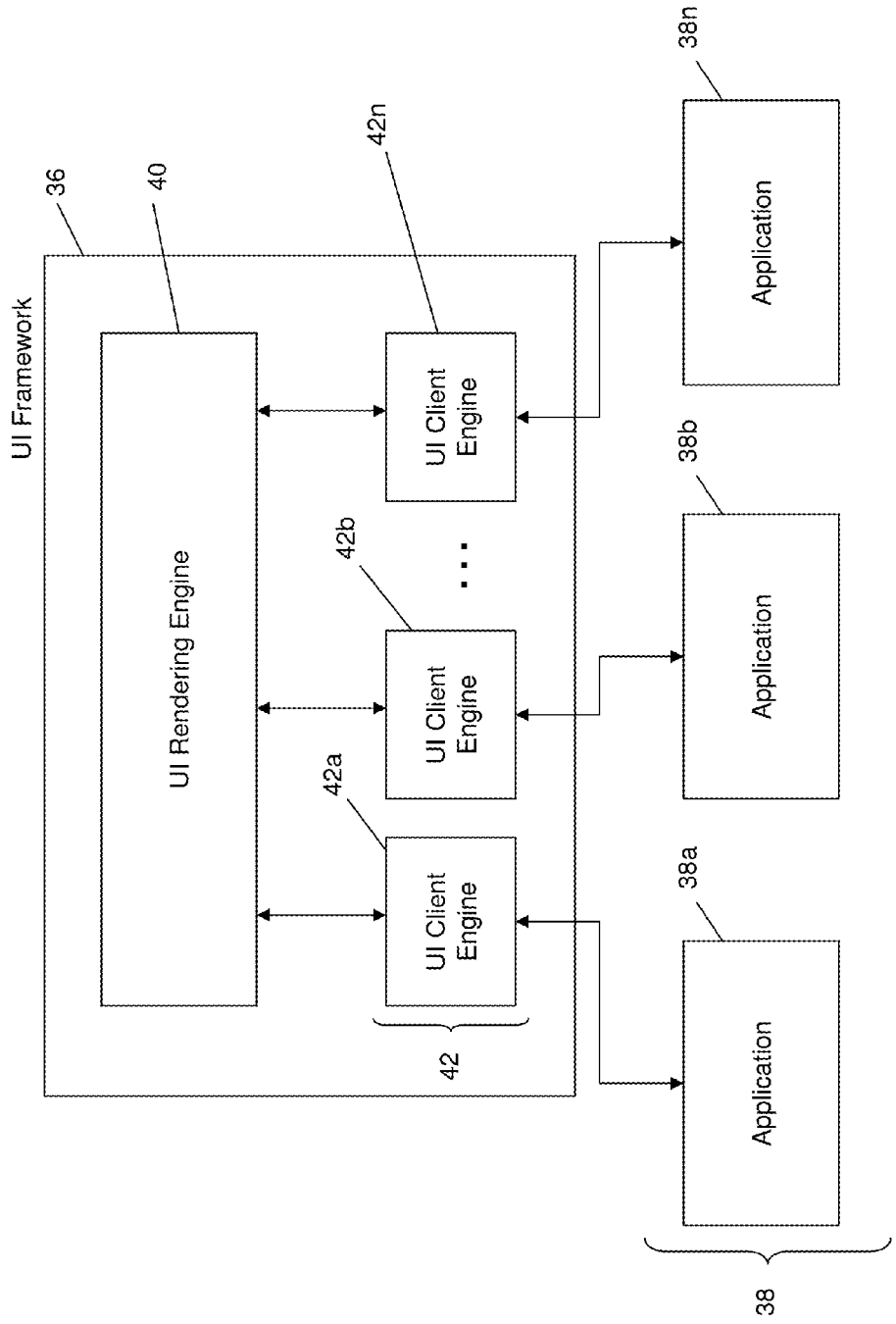
FIG. 5 is a block diagram illustrating an example of a configuration for a UI framework.

The UI framework 36 shown in FIG. 5 differs from conventional UIs that are developed for individual applications by the application developers with limited or no consistency between the UIs for different applications. For example, in conventional systems, an application is responsible for driving its UI. The application creates the UI elements, composites them into a complete UI screen and is responsible for displaying them. The actual rendering is often handled by the UI framework (e.g., calling the draw function for all widgets on the screen), but most of the code related to the UI is within the application. It is the responsibility of the application to collect the requisite data for each UI and to populate the UI. The data flow in the system is therefore driven by the applications, leading to a large amount of UI-related code in the application that is both difficult to maintain and customize.

The UI framework 36 herein described is independent of device platform (e.g., independent of mobile device architecture and operating system) as well as application framework (e.g., independent of application programming language). The UI framework 36 described herein provides scalability, improved graphical capabilities and ease of customization, and results in enhanced user experiences. The UI framework 36 is used by applications 38 to render their UIs. The UI framework 36 is itself not an application framework (i.e., is not used for developing applications) and does not impose any rules on application structuring or application management. The UI framework 36 does not provide application functionality. The applications 38 themselves implement the functionality (or business logic) behind the UI. However, using the UI framework 36 removes all UI call functionalities from the application code and instead lets the UI control data call functions. Thus, a the UI can interact with multiple applications for data requests in a seamless manner. The single UI framework 36 described herein enforces a clear separation between UI visualization, UI logic, and UI data thereby allowing the creation of a seamless and truly rich UI. The applications 38 are reduced to simple services, responsible for performing business logic and provide the data that the UI requests. An advantage of the single UI framework 36 is that it allows that UI designer to create any user scenario without having to account for the applications 36 that are currently running on the mobile device 10, or whether or not multiple display screens 16, 20 are available for displaying UI elements 12, 14. That is, the UI is driving the data flow. If there is a list on the screen displaying contacts, there will be requests for data to a Contacts List application. The UI designer can readily use any application 38 available on the mobile device 10 for its UI without having to specifically create or implement UI elements and populate the lists. Consequently, the architecture of the UI framework 36 described herein enables seamless cross application scenarios such as the example shown in FIGS. 1 to 3.

The UI framework 36 shown in FIG. 5 comprises multiple modules or engines: typically, a single UI rendering engine 40 for a device 10 or a display 34; and separate UI client engines 42a, 42b, . . . 42n associated with separate applications 38a, 38b, and 38n respectively. Each of these modules 40, 42 is described in further detail below with reference to FIG. 6.

Each UI client engine 42 is responsible for providing UI data from its associated application 38 to the UI rendering engine 40. The UI client engine 42 is responsible for setting up UI component trees 44 and informing the UI rendering engine 40 of the tree structure 44. In the example shown in FIG. 6 the UI component tree 44 includes an item 46 as a parent node, with two data items 48a, 48b as child nodes. The UI client engine 42 gets this information from the application 38. For example, the application code could specify the creation of elements, such as buttons and containers, programmatically in a language such as C++, or the application could describe the tree in a declarative language, such as XML, and have the UI client engine load it. The UI rendering engine 40 mirrors the tree 44 set up by UI client engine 42 to create a mirrored tree 50. The UI rendering engine 40 sets up visual node trees 52, 54a, and 54b for each UI element 46, 48a, 48b of the UI component tree 44. To set up the visual node trees 50, the UI rendering engine 40 has predefined visual node trees 50 for each UI component that the UI client engine 42 provides. For example if the UI client engine 42 sets up a Button, the UI rendering engine 42 will have a predefined visual node tree 50 for Button which it will use. Typically, this predefined visual node tree 50 will be described in a mark-up language, such as XML, but it could also be described in programmatic code, such as an API. The visual node trees 50 are used for rendering the elements (for example the background, foreground and highlight images of a button is represented in the visual node tree 50). The UI client engine 42 is not aware of the visual node trees.

The UI rendering engine 40 handles the logic and event handling associated with the UI elements that composite the UI (e.g., lists, menus, softkeys, etc.). The UI rendering engine 40 receives data from the UI client engine 42 in an asynchronous manner, and binds the data to its visual nodes in the visual tree 50. As used herein "asynchronous" means that the transmission of data from the UI client engine 42 to the UI rendering engine 40 is independent of processing of data, or inputs, by the application 38. All data that can be presented in the UI for processing as a single thread is made available to the UI rendering engine 40 as it is available to the UI client engine 42. The underlying application processing and data sources behind the UI client engine 42 are hidden from the UI rendering engine 40. The UI client engine 42 and UI rendering engine 40 can execute separate threads without waiting for responses from each other. In this manner, the UI rendering engine 40 can render the UI tree 44 (using the visual node tree 50) without being blocked or stalled by UI client engine 42.

Since the UI client engine 42 sends data to the UI rendering engine 40 as it becomes available, the UI client engine 42 should also indicate to the UI rendering engine 40 whether the data is complete, or to await further data prior to rendering. In an example implementation, the data items necessary for rendering the UI form a "transaction." Rather than waiting until all required data items are available, the UI client engine 42 can send data items relating to a single transaction in several communications or messages as they become available, and the messages will be received asynchronously by the UI rendering engine 40. The UI rendering engine 40 does not start processing the received data items until it has received all messages that at are part of the transaction.

For example, the UI client engine 42 can inform the UI rendering engine 40 that one container with two child buttons has been created as one transaction. The UI rendering engine 40 does not process this transaction until it has received all data items related to the particular transaction. In other words, the UI rendering engine 40 will not create the container and buttons before it has all the information.

The UI client engine 42 and the UI rendering engine 40 are as decoupled from each other as possible. The UI client engine 42 is not aware of where in the UI its data is used, i.e., it does not hold a UI state. The elements are the building blocks of the UI. The elements of the UI component tree 44 represent the basic UI elements, lists, menus, tab lists, soft keys, etc. Elements are typically specified in a declarative language such as XML or JSON (currently QML which is JSON based), and given different attributes to make them behave as desired. Examples of attributes include rendered attributes, response attributes, and decoding attributes. Rendered attributes refer to any attribute that specifies how a UI element is rendered. Examples of rendered attributes can include color, opacity/transparency, the position on the display, orientation, shape, and size. In various embodiments, the position on the display 34 can be described with any suitable coordinate system including (x,y) coordinates or (x,y,z) coordinates. It can be appreciated however that the position or size of a UI element relative to the virtual screen space may be specified based on a relative dimension such as % length, etc.

Examples of response attributes can include any attribute that specifies how the user interface element responds to commands or inputs, such as for example, a single tap, double tap or swipe. For example, a response attribute can specify a speed of a double tap for the UI element. Decoding attributes can include image decoding priority. A complete UI is a set of elements composited in a visual tree. The elements interpret their associated data—for example, a menu component will interpret the data differently from a list component. The elements react upon events—for example, when a key is pressed or other event is posted to the UI, the elements in the UI will react, e.g., move up and down in a list or opening a sub menu. The elements also bind data to their respective visual tree nodes. The elements have built in UI logic (such as "highlight when pressed", "scroll when flicked", "navigate to tab 3 when tab 3 icon is clicked"), but the application logic (such as "start new application", "find shortest route to bus station", etc.) is in the application code, and typically is triggered by high level events from the elements (e.g. a "Button Click" event detected by the UI rendering engine 40, and passed to the UI client engine 42, may trigger the application to "find shortest route").

Visuals define the appearance of elements, and are specified in the visual node trees 50. In an example, the visuals may be defined in XML. The XML code could be generated independently or using a suitable visuals generation application. A visual could, for example, be a generic list that can be used by several different lists or a highly specialized visualization of a media player with a number of graphical effects and animations. Using different visual representations of elements is an effective way to change the look and feel of the UI. For example, skin changes can readily be done simply by changing the visuals of components in the UI. If the visuals have a reference to a specific data element, the UI client engine 42 retrieves the data from the application 39 and transmits such data to the UI rendering engine 40. The UI client engine 42 also initiates animations on visuals. For example, UI client engine 904 can create and start animations on properties of UI elements (position, opacity, etc.).

The UI client engine 42 is unaware of the actual composition and structure of its visuals. For example, when a list item receives focus, the list element will assume that there is animation for focusing in the list item visuals. The UI rendering engine 40 executes started animations. Animations run without involvement from the UI client engine 42. In other words, the UI client engine 42 cannot block the rendering of animations. The UI rendering engine 40 is a rendering engine that may be specifically optimized for the electronic device. The rendering engine 40 is capable of rendering a tree of visual elements 44 and effects and performing real time animations. The UI rendering engine 40 renders the pixels that eventually will be copied on to the physical screen 16 of the mobile device 10, for example. All elements active on the display 34 have a graphical representation in the visual tree 44. The UI rendering engine 40 processes touch/key input without UI client engine 42 involvement to ensure responsiveness (for example, list scrolling, changing of slider values, component animations, etc. run without UI client engine involvement). The UI rendering engine 40 notifies UI client engine 42 that a button has been pressed, slider has been dragged, etc. The UI client engine 42 can then react on the event (for example change the brightness if the slider has been dragged), but as already mentioned above, the UI client engine 42 does not need to be involved in updating the actual UI, only in responding to events from the UI. The advantages of the UI driven architecture described herein is readily apparent during runtime. Runtime behaviour is defined by what is visible on the display screen 16 of the mobile device 10.

Figure 6:
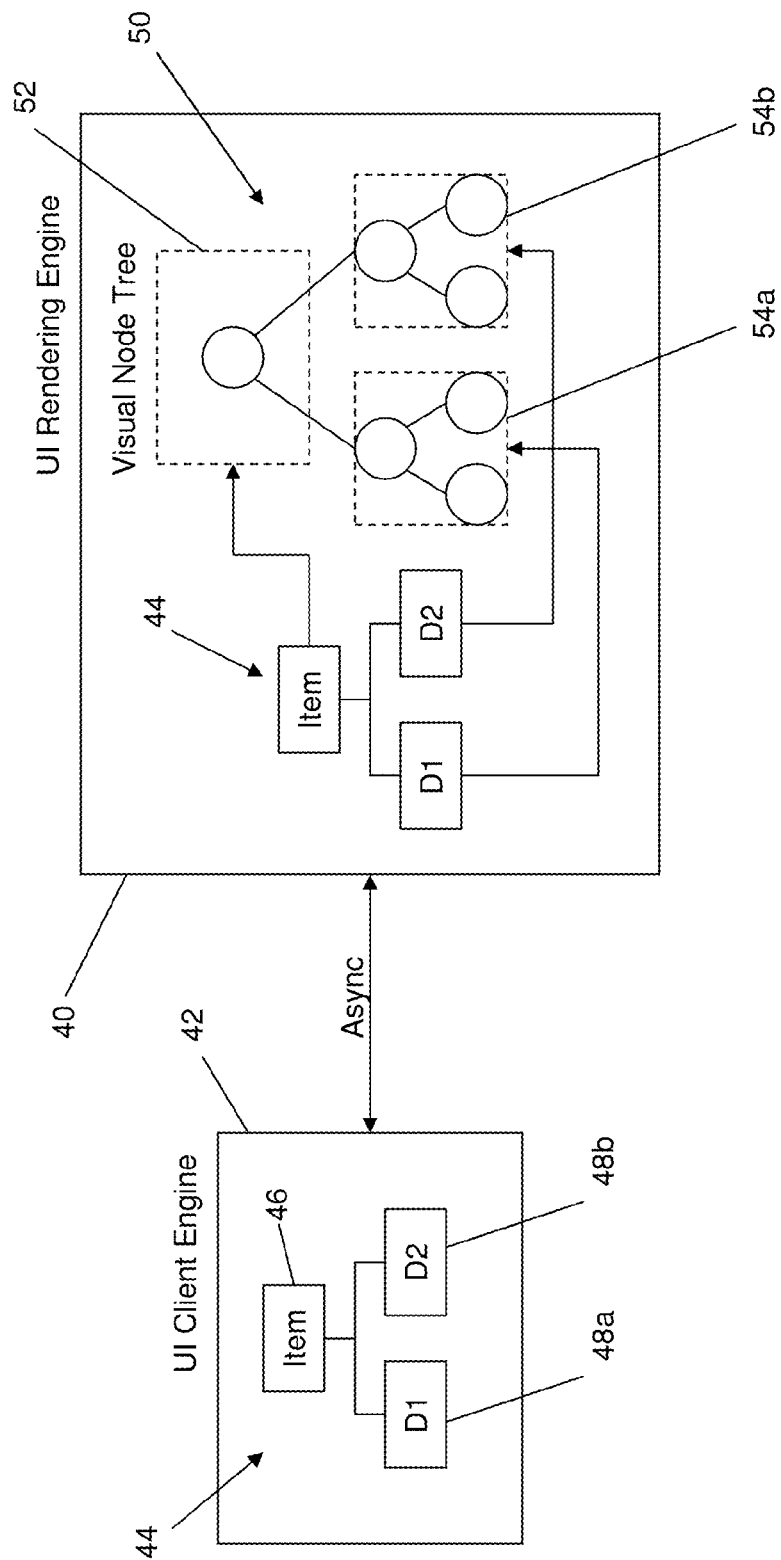
FIG. 6 is a block diagram illustrating example configurations for a UI client engine and a UI rendering engine.

The UI rendering engine 40 may operate in a single client, single server configuration, similar to the configuration shown in FIG. 6. In such a configuration, the UI rendering engine 40 receive a UI component tree 44 for an application 38 from a UI client engine 40 associated with the application 38. Based on the component tree 44, the UI rendering engine 40 then determines a visual node tree 50 for each element, and assembles the visual node trees 50 into an overall visual node tree corresponding to the UI component tree 44. The UI rendering engine 40 then asynchronously receives, from the UI client engine 42, UI data items related to elements of the UI component tree 44. The UI rendering engine 40 populates the visual node tree 50 with the UI elements, and renders them to the UI in accordance with the visual node tree 50, independently of further input from the UI client engine 42. Since the UI client thread, which depends on interaction with the application 38, is separate and independent from the UI rendering thread, the rendering thread is not blocked by the application processing.

When the UI rendering engine 40 detects a user input in the UI, it communicates the user input to the UI client engine 42 for further processing. In addition, if necessary, the UI rendering engine 40 re-renders the UI in response to the user input independently of further input from the UI client engine 42. For example, if the user input is a button press, the UI rendering engine 40 re-renders to animate a button associated with the button press. If the UI client engine 42 determines that the user input received from the UI rendering engine 40 requires new data, i.e. a "modification" to the UI, the UI client engine 42 sends further data items invoking the modification to the UI rendering engine 40, which then re-renders UI in accordance with the further data items and their associated visual node tree 50, independently of further input from the client UI engine 42. For example, as described above, the UI client engine 42 could initiate an animation effect.

According to another aspect, the UI framework 36 can operate in a configuration wherein a single UI rendering engine 40 can support multiple UI client engines 42a, 42b, etc, e.g., as shown in FIG. 5. Thus, multiple applications 38 can coexist on the single UI rendering engine 40. The UI client engines 42a, 42b, etc. each associated with an application 38a, 38b, etc., or an instance of an application 38, while the UI rendering engine 40 is associated with a display 34. Each UI client engine 42 determines a corresponding UI component tree 44 for its respective application. Each UI client engine 42 also receives inputs from its respective application 38 related to elements of its UI component tree 44, and determines UI data items related to the inputs.

In operation, the UI rendering engine 40 receives the UI component trees 44 from the UI client engines 42a, 42b, etc. The UI rendering engine 1402 then joins the plurality of UI component trees 44 into a single tree structure. To specify the parameters for joining the trees, the UI client engines 42a, 42b, etc. can, for example, define or indicate where in their trees 44 other trees can be inserted. Subject to the logic implemented in the UI rendering engine 40, the UI client engines 42a, 42b, etc. can indicate the location of possible tree insertions in a generic way, such as "here it is ok to insert a background effect". The UI client engines 42a, 42b, etc. can also suggest, define or indicate where their tree 44 should be inserted. This indication can also be performed in a quite general way, such as "I want to insert a particle effect in the background". The UI rendering engine 40 can then determine an appropriate location to insert the tree within the UI tree structure 44. Once in possession of a the single tree structure, the UI rendering engine 40 determines a visual node tree 50 for the single tree structure, and then populates the visual node tree 50 with UI data items received from at least one of the plurality of UI client engines 42, and renders the UI in accordance with the visual node tree 50 independently of further input from UI client engines 42, as described above.

Different UI client engines 42a, 42b, etc., with different language bindings can coexist in same node/render tree, no matter what runtime limitations the language has (e.g. Python & threads). Since the individual UI component trees 44 of the applications 38 are combined to a single joint UI tree on the UI rendering engine 40, the UI that is rendered by the "server" (i.e. the UI rendering engine 40) will, for end users, appear as if all the application UIs are part of the same application 38.

According to yet another aspect, a single UI rendering engine 40 can support multiple UI client engines 42 and their associated applications 38, running on different devices 10, 18 or different platforms, such as a local device and an application 38 running on a remote device, such as in the cloud or on networked server. As above, since the UI client engines 42 for each application 38 inject their trees and data items into the same tree on the UI rendering engine 40, all scene graph UI advantages apply. The UI rendering engine 40 does not need to know anything about a new application, so, for example, the UI client engine 42 for a new car radio application can be transparently injected into a common UI for an in-vehicle navigation system, for example.

Figure 7:
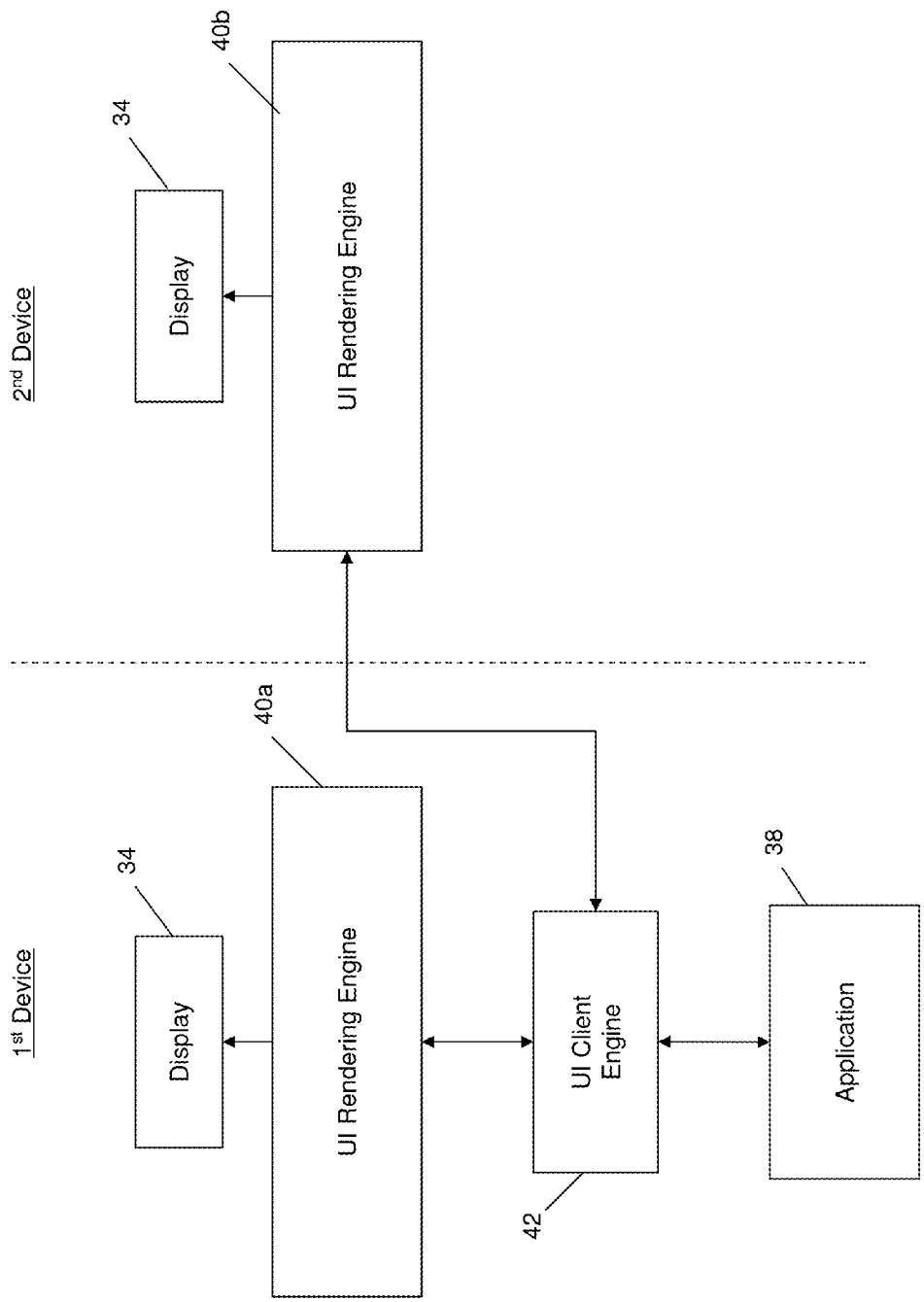
FIG. 7 is a block diagram illustrating a UI client engine communicable with first and second UI rendering engines for distributing UI elements on first and second mobile device screens.

According to another aspect, and as shown in FIG. 7, multiple UI rendering engines 40a, 40b can support a single UI client engine 42, and its associated application 38. Such a configuration enables an application 38 on the first mobile device 10 to utilize the screen space of the second mobile device 18 by having the UI framework 36 on the first mobile device 10 communicate with a second UI rendering engine 40b on the second mobile device 18.

In this way, the single UI client engine 42 can inject its tree 44, and provide data items to multiple devices, such as a desktop computer and a portable electronic device, or a pair of mobile devices 10, 18 as shown in FIGS. 1 to 3. Each device can have a separate UI rendering engines 40a, 40b, optimized for its particular form factor and display capabilities. Since the UI rendering engines 40a, 40b do their own rendering, it is possible to make a distributed UI that is responsive regardless of transport layer performance. According to this aspect, the UI client engine 42 determines a UI component tree 44 for the application 38, receives inputs from the application 38 related to elements of the UI component tree 44, and determines UI data items related to the inputs, as described above. The UI client engine 42 then interfaces with two or more UI rendering engines 40, each of which can be associated with a separate display 34, or be designed and optimized for different performance, as described below.

In operation, the UI rendering engines 40a, 40b each receive the UI component tree 44 from the client UI engine 42, and individually determine a visual node tree 50 for the UI component tree 44. The separate UI rendering engines 40a, 40b asynchronously receive, from the UI client engine 42, the UI data items related to elements of the UI component tree 44, and populate the visual node tree 50 with the UI data items. Each UI rendering engine 40 then renders the UI in accordance with the visual node tree 50 independently of further input from the client UI engine 42. If a user input, such as a touch event or gesture, is detected by one of the UI rendering engines 40a, 40b, the input is communicated back to the UI client engine 42, and to the other UI rendering engine 40. Both UI rendering engines 40a, 40b can then re-render the UI if appropriate, while the UI client engine 42 can provide the input to the application 38, or otherwise act upon it.

As a further example (not shown), the single UI client engine 42 can use several UI rendering engines on a same device. For example, UI rendering engine 40a could include an OpenGL renderer, while UI rendering engine 40b could include a software rendering backend/rasterizer. The different UI rendering engines 40a, 40b could, for example, be different versions of the rendering engine 40 on the same device. For example, UI rendering engines 40a, 40b could be designed to render at different frame rates to serve different displays on a multi-display device. The UI rendering engines 40a, 40b could provide different power management capabilities. For example, using wallpaper as example, UI rendering engine 40a could render wallpaper or background with less fidelity (lower resolution) to meet power management requirements. The UI rendering engines 40a, 40b could form a dynamic cluster, distributing different UI elements of a client application 38 between rendering engines 40a, 40b to meet metrics like expected FPS, power management, and resource management. The UI rendering engines 40a, 40b can, for example, selectively render different elements or parts of the UI, as defined by the UI client engine 42. The division of rendering tasks can be, for example, defined in an appropriate mark-up language, such as XML, or programmatically, such as in an API. Generally, the UI rendering engines 40a, 40b work independently to render their element(s) of the UI. However, in a standalone mode, the UI rendering engines 40a, 40b could exchange data to improve rendering efficiency.

Referring again to FIG. 7, it can be appreciated that the UI frameworks 36 of the first and second mobile devices 10, 18 enable a client-server configuration to be arranged such that the UI client engine 42 can have UI elements rendered on both displays 34 by communicating with the corresponding UI rendering engines 40a, 40b. Since the UI client engine 42 removes low-level programming burden from the application 38, the coordination of the UI being rendered across multiple screens can be performed by the UI client engine 42 to take advantage of the additional screen space when available without the application 38 requiring custom programming for each device type, form factor, screen size, etc.

Figure 8:
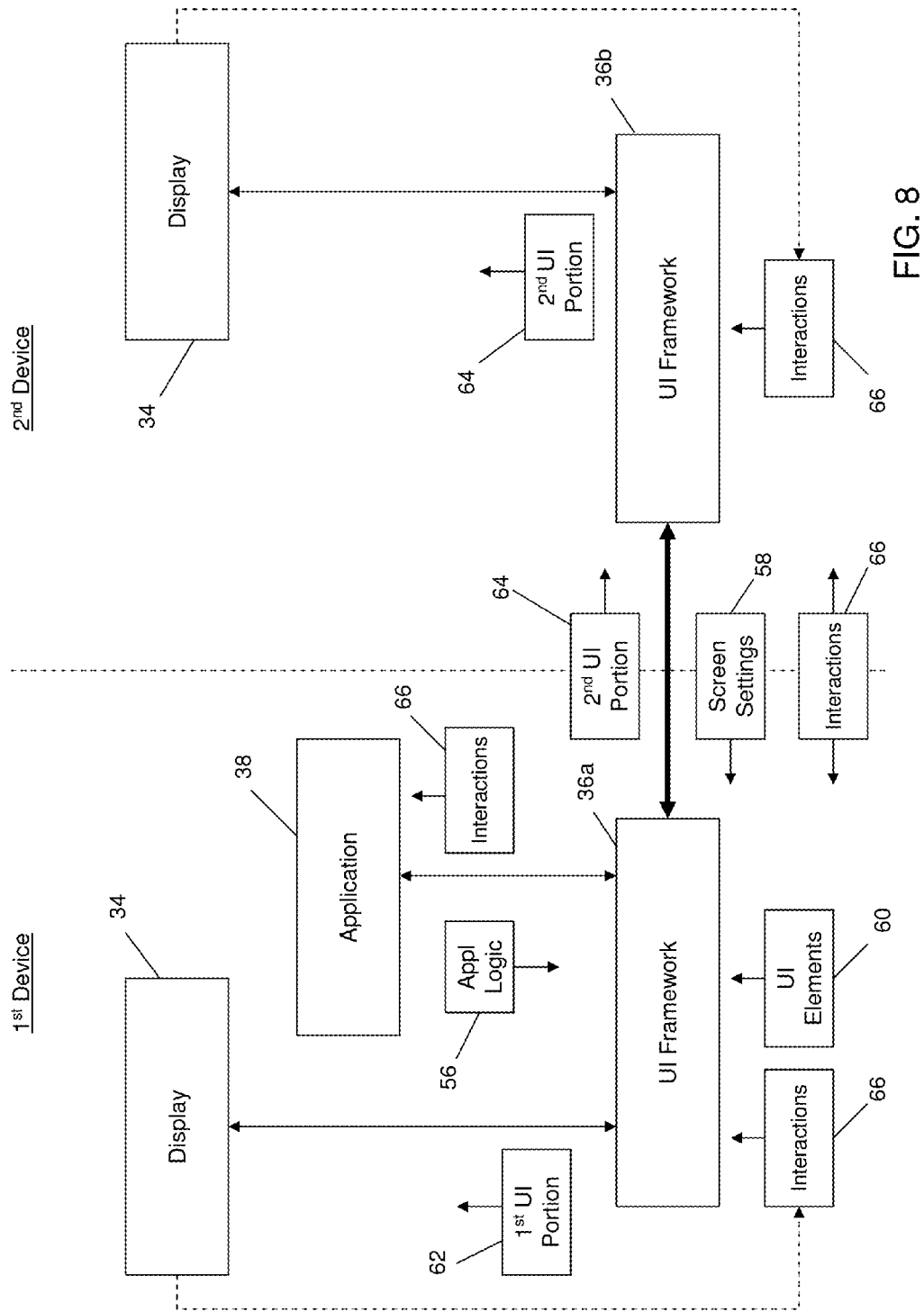
FIG. 8 is a flow diagram illustrating data flow between a pair of mobile devices for distributing UI elements on multiple display screens.

FIG. 8 illustrates data flows between the first mobile device 10 and the second mobile device 18 coordinated by UI frameworks 36a, 36b on the respective devices. The application 38 exposes or otherwise provides or makes available application logic 56 that defines what screen modes and UI arrangements are permitted by the application 38. For example, the application logic 56 may define which UI elements can be rendered on the screen 20 of the second mobile device 18, the relative arrangement of UI elements in portrait versus landscape orientations, etc. Screen settings 58 are provided by the UI framework 36b of the second mobile device 18 when the two devices are paired and communicating with each other at close range. As will be discussed in greater detail below, after determining that screen space on another device is available to be used by the application 38, the UI framework 36a of the first mobile device 10 can communicate with the UI framework 36b of the second mobile device 18 in order to determine the screen size, among other things that may be relevant to the rendering of the UI.

The application logic 56 also defines what UI elements 60 are to be included in the UI, and, if applicable, from where the UI elements 60 can be obtained. As described above, the UI elements 60 may be stored in a memory on the mobile device 10 and may be obtained by the UI framework 36a in order to have them rendered on the display 34 for the application 38. When distributing a UI across multiple devices, e.g., as shown in FIG. 8, data for a first UI portion 62 may be rendered on the display 34 of the first mobile device 10, and data for a second UI portion 64 may be rendered on the display 34 of the second mobile device 18. As a result of the connection between the first and second mobile devices 10, 18, interactions 66 with the application 38 and the UI being displayed on the screens 16, 20 are coordinated between the UI frameworks 36a, 36b. As shown by way of example in FIG. 8, interactions 66 detected on either mobile device 10, 18 (including interactions 66 detected via the display 34 itself, e.g., gestures, touches, taps, etc.), are handled by the UI framework 36 on the corresponding mobile device 10, 18 in order for such interactions 66, if applicable, to be communicated back to the application 38, e.g., to perform an operation such as a database call, message send operation, etc.

Figure 9:
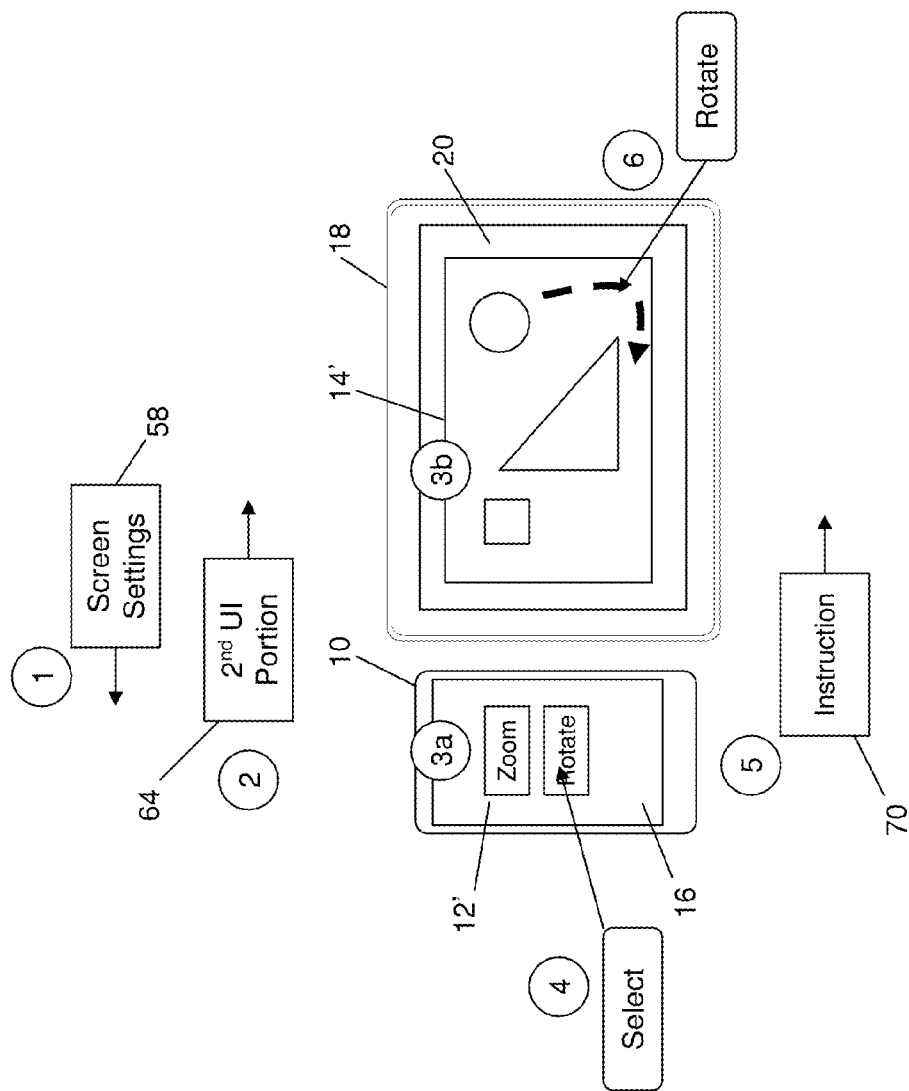
FIG. 9 is a flow diagram illustrating an example interaction with a UI distributed on multiple display screens.

An example of an interaction is shown in FIG. 9. In FIG. 9, the first mobile device 10 displays a first UI element 12' including zoom and rotate operates while, at the same time, the second mobile device 18 displays a second UI element 14' including an image that can be zoomed into or out of, or rotated using the functions displayed on the first mobile device 10. At stage 1, the screen settings 58 are provided by the second mobile device 18 to the first mobile device 10 and a second UI portion 64 is sent by the first mobile device 10 at stage 2. Stages 3a and 3b include displaying first and second UI portions 62, 64 respectively (as discussed above), thus distributing the UI experience across the first and second mobile devices 10, 18. At stage 4, a user selects the rotate function displayed on the first screen 16. To apply this function to the image being displayed on the second screen 20, an instruction 70 is generated and sent by the first mobile device 10 to the second mobile device 18 at stage 5. A rotation of the image may then be rendered by the UI framework 36 on the second mobile device 18 at stage 6.

Figure 10:
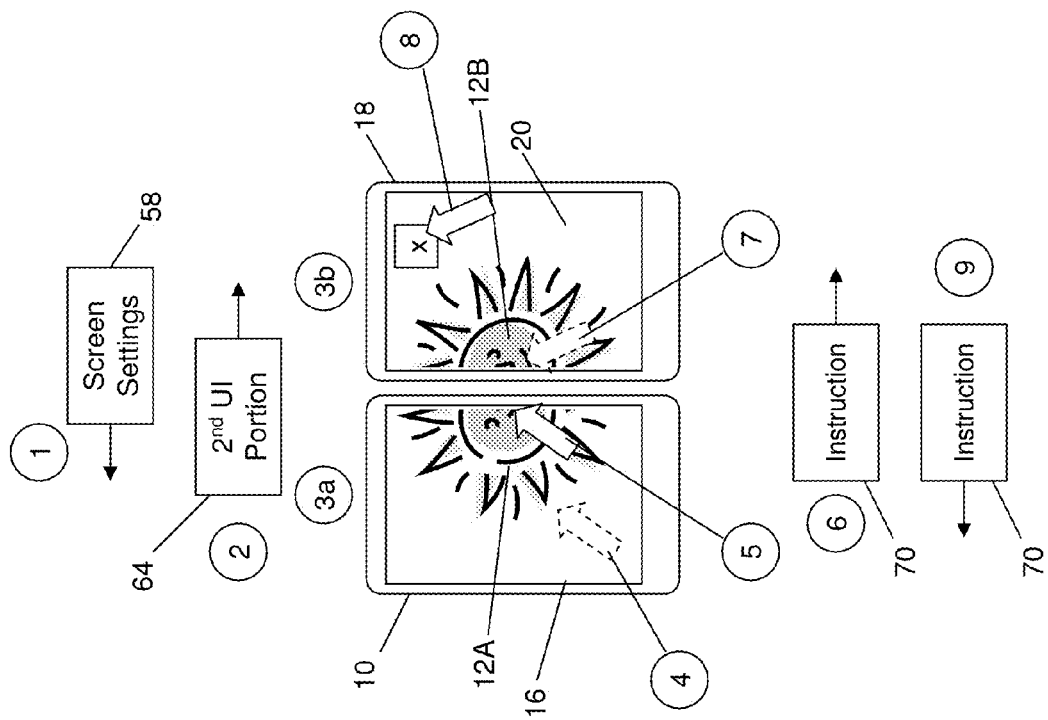
FIG. 10 is a flow diagram illustrating another example interaction with a UI distributed on multiple display screens.

Another example of an interaction is shown in FIG. 10. In FIG. 10, the first mobile device 10 displays a first portion 12A of a UI element, and the second mobile device 18 displays a second portion 12B of the UI element. At stage 1, the screen settings 58 are provided by the second mobile device 18 to the first mobile device 10 and a second UI portion 64 is sent by the first mobile device 10 at stage 2. It can be appreciated that the second UI portion 64 sent at stage 2 may include an already modified version of the complete image, or the original image with instructions for modifying the image on the second mobile device 18 when rendering the second UI portion 64. Stages 3a and 3b include displaying first and second UI portions 62, 64 respectively (as discussed above), thus distributing the UI experience across the first and second mobile devices 10, 18. Between stages 4 and 5 a cursor is moved across the first screen 16 causing an instruction 70 to be sent from the first mobile device 10 to the second mobile device 18 at stage 6 to have the cursor appear on the second screen 20 at stage 7. At stage 8 in this example, an operation is performed on the second mobile device 18, namely the selection of a button to close the image. Selection of the close button causes a second instruction 70 to be sent from the second mobile device 18 to the first mobile device 10 at stage 9 to have the UI framework 36 on the first mobile device 10 coordinate with the application 38 and the UI rendering engines 40a, 40b to update the respective displays 34.

Figure 11:
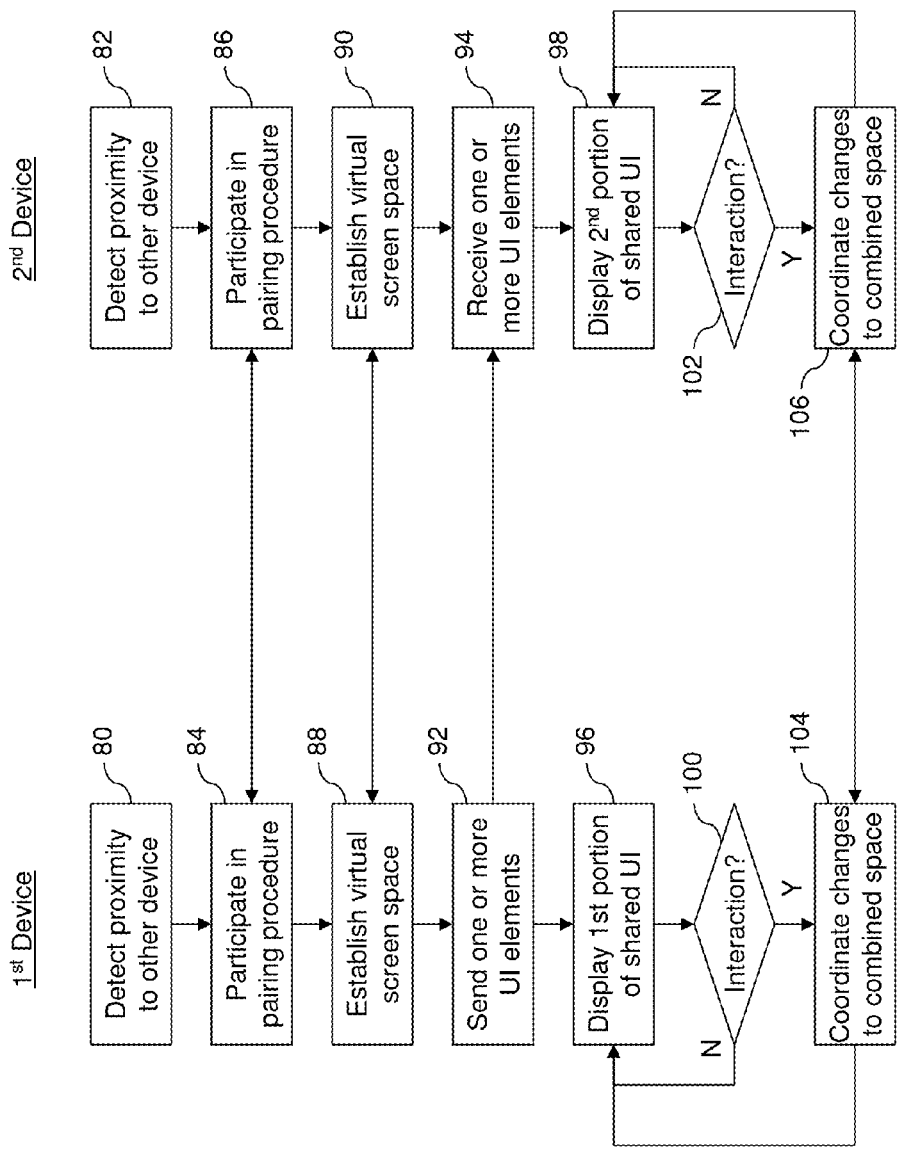
FIG. 11 is a flow chart illustrating an example of a set of computer executable instructions that may be performed in distributing a UI over multiple display screens.

FIG. 11 illustrates an example of a set of computer executable instructions that may be performed in distributing a UI over multiple display screens. At 80 the first mobile device 10 detects that the second mobile device 18 is in the proximity of the first mobile device 10, e.g., via Bluetooth discovery. Similarly, the second mobile device 18 detects that the first mobile device 10 is in the proximity of the second mobile device 18 at 82. It can be appreciated that only one of the first and second mobile devices 10, 18 may detect the proximity of the two devices and that device may initiate contact with the other device. The set of operations shown in FIG. 11 are therefore illustrative only. The first mobile device 10 participates in a pairing procedures at 84 with the second mobile device 18 that also participates in the pairing procedure at 86. For example, after discovering that they are near to each other, the first and second mobile devices 10, 18 may participate in a Bluetooth pairing procedure. However, it can be appreciated that the first and second mobile devices 10, 18 may have been previously paired and thus operations 84 and 86 may be executed automatically without user input.

Once the first and second mobile devices 10, 18 are near each other and paired, they are capable of communicating with each other over a short-range communications channel thus established and may exchange data. At 88 and 90, the first mobile device 10 and second mobile device 18 may then establish a virtual screen space. The operations performed at 88 and 90 may vary depending on which device initiates the pairing. For example, one of the devices sharing data may have an application 38 running that intends on sharing data and therefore initiates the establishment of the virtual screen that incorporates the display screens 16 and 20. In the example shown in FIG. 11, it is assumed that the first mobile device 10 is sharing data or otherwise utilizing the combined virtual screen and may be designated as the "master" device while the second mobile device 18 is designated the "slave" device. It can be appreciated that the master/slave relationship is only one example and various other configurations may be applicable, including "masterless" configurations.

By establishing the first mobile device 10 as the master device, the first mobile device 10 is capable of taking over the display screen 20 of the second mobile device 18 and sends one or more UI elements to the second mobile device at 92, e.g., the $2^{nd}$ UI portion 64 as shown in FIG. 8. The UI framework 36 of the second mobile device 18 receives the one or more UI elements at 94 and the first mobile device 10 displays the first UI portion 62 at 96 and the second mobile device displays the second UI portion 64 at 98. At 100 and 102, the first and second mobile devices 10, 18 are operating with a shared UI controlled by an application 38 on the first mobile device 10, and interactions are tracked by the respective UI frameworks 36. The first and second UI portions 62, 64 remain displayed until an interaction is detected at 100 or 102, at which time the first and second devices 10, 18 coordinate changes to the combined display screen at 104 and 106 respectively. The operations performed at 104 and 106 vary depending on which device detects the interaction, and the nature of the interaction. For example, some interactions may cause a change to the currently displayed UI elements, whereas other interactions may cause the current UI elements to be replaced by new UI elements. The UI elements are rendered by the UI rendering engines 40a, 40b, according to the interactions, e.g., as discussed above.

Figure 12:
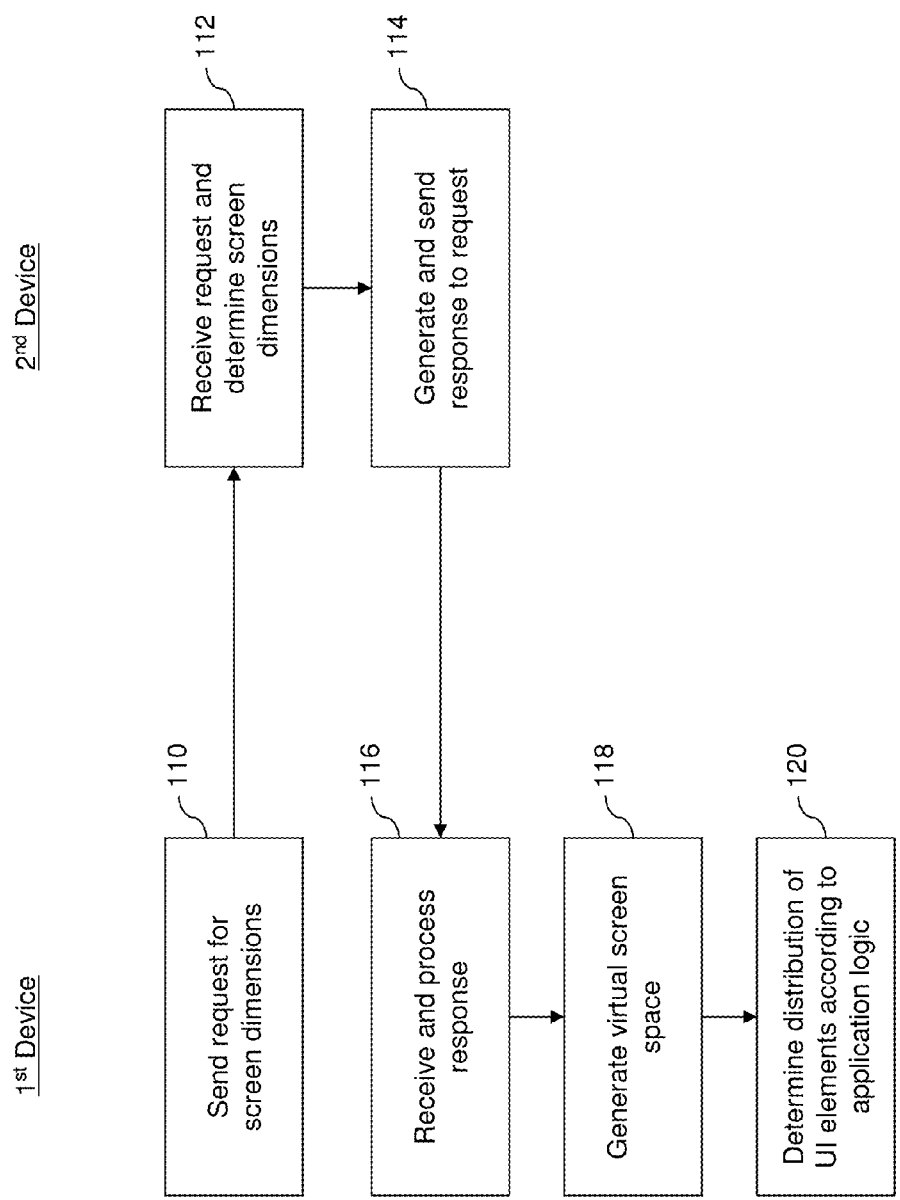
FIG. 12 is a flow chart illustrating an example of a set of computer executable instructions that may be performed in establishing a virtual screen space utilizing screens of multiple mobile devices.

FIG. 12 illustrates an example of a set of computer executable instructions that may be performed in establishing a virtual screen space utilizing screens of multiple mobile devices, e.g., during operations 88 and 90 in FIG. 11. At 110 the first mobile device 10 sends a request for screen dimensions to the second mobile device 18. The second mobile device 18 receives the request at 112 and determines the screen dimensions available to be shared. It can be appreciated that the second mobile device 18 may have dual screens or portions of a single screen that cannot be shared and thus may allocate screen space available to be shared according to predetermined constraints. The second device 18 generates and sends a response to the request at 114, which includes the screen dimensions that the UI rendering engine 40b on the second mobile device 18 can utilize in rendering the second UI portion 64. The first mobile device 10 receives and the UI framework 36a processes the response at 116 on behalf of and transparent to the application 38 requesting or otherwise being capable of utilizing the shared screen. The UI rendering engine 40a then generates the virtual screen space at 118 and determines the distribution of UI elements, e.g., according to application logic provided by the application 38. As shown in FIG. 11, by determining which UI elements are to be displayed by the second mobile device 18, the second UI portion 64 can be provided to the second mobile device 18 at 92.

Figure 13:
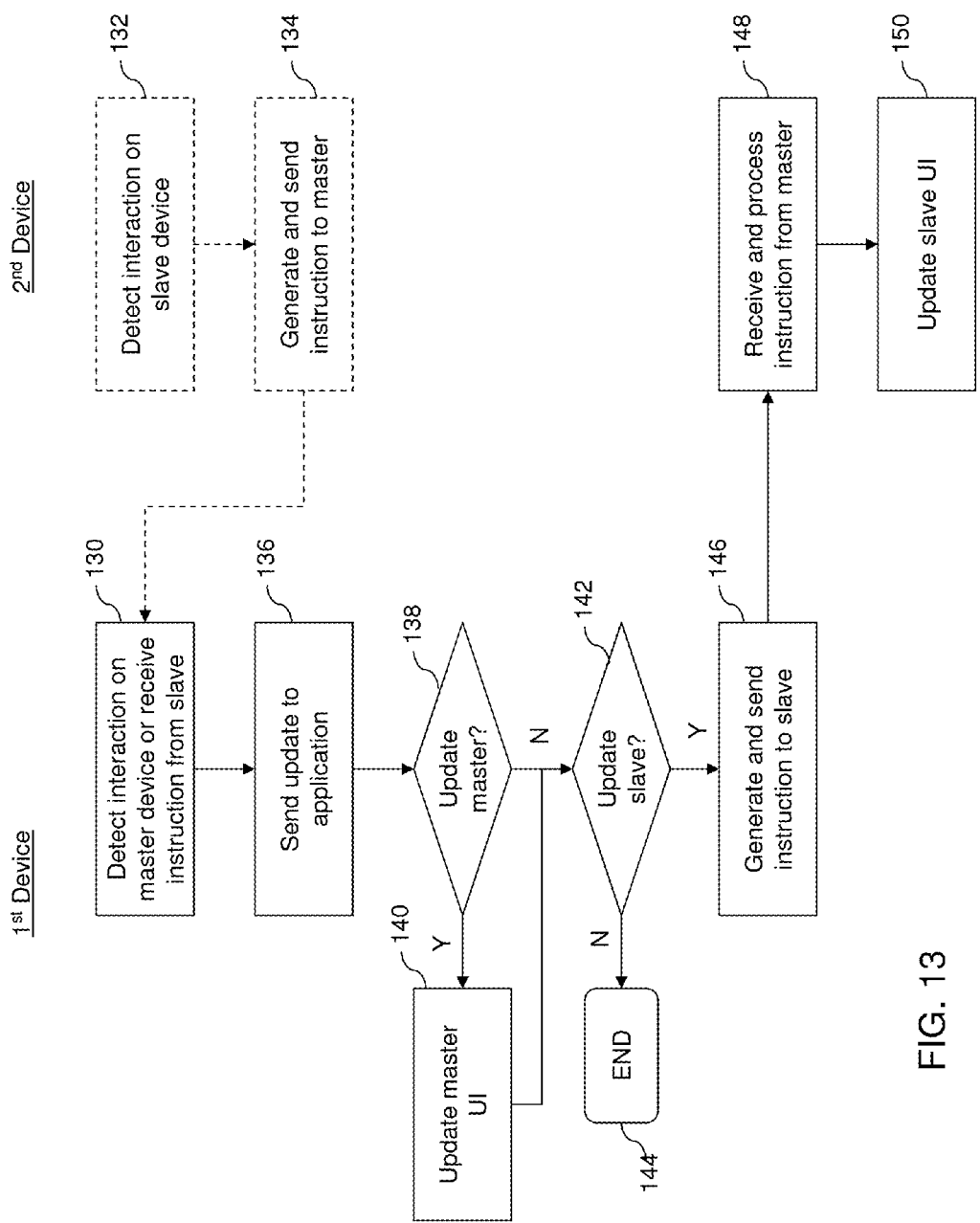
FIG. 13 is a flow chart illustrating an example of a set of computer executable instructions that may be performed in coordinating changes to a virtual screen space based on interactions with UI elements.

FIG. 13 illustrates an example of a set of computer executable instructions that may be performed in coordinating changes to a virtual screen space based on interactions with UI elements, e.g., during operations 104 and 106 in FIG. 11. In the example shown in FIG. 13, it is assumed that an interaction is detected on the first mobile device 10 at 130. However, as illustrated using dashed lines, the interaction may also be detected on the second mobile device 18 at 132 and an instruction generated and sent by the second mobile device 18 to the first mobile device 10 at 134. Once an interaction has been detected at 130, an update is sent to the application 38 at 136, e.g., to obtain further logic or instructions for updating the UI. The UI framework 36 on the master device (e.g., first mobile device 10) determines if the UI being displayed on the master device needs to be updated at 138. If so, the master UI is updated at 140, e.g., by obtaining further UI elements or modifying currently displayed UI elements. The UI framework 36 on the master device then determines if the slave device (e.g., second mobile device 18) needs to be updated according to the interaction detected at 142. If not, the process ends at 144 since the second UI portion 64 does not require updating. If the slave device needs to be updated, the UI framework 36 generates and sends an instruction to the slave device at 146, which is received and processed by the slave device at 148. The slave UI may then be updated at 150.

It can therefore be seen that by having the UI frameworks 36a, 36b on the paired devices handle the UI decisions such as how to update the respective UI spaces based on detected interactions, the application developer does not need to expend significant programming resources on low level programming that would require knowledge of the size, form factor, OS version, etc. of the device being utilized to create the combined space.

Figure 14:
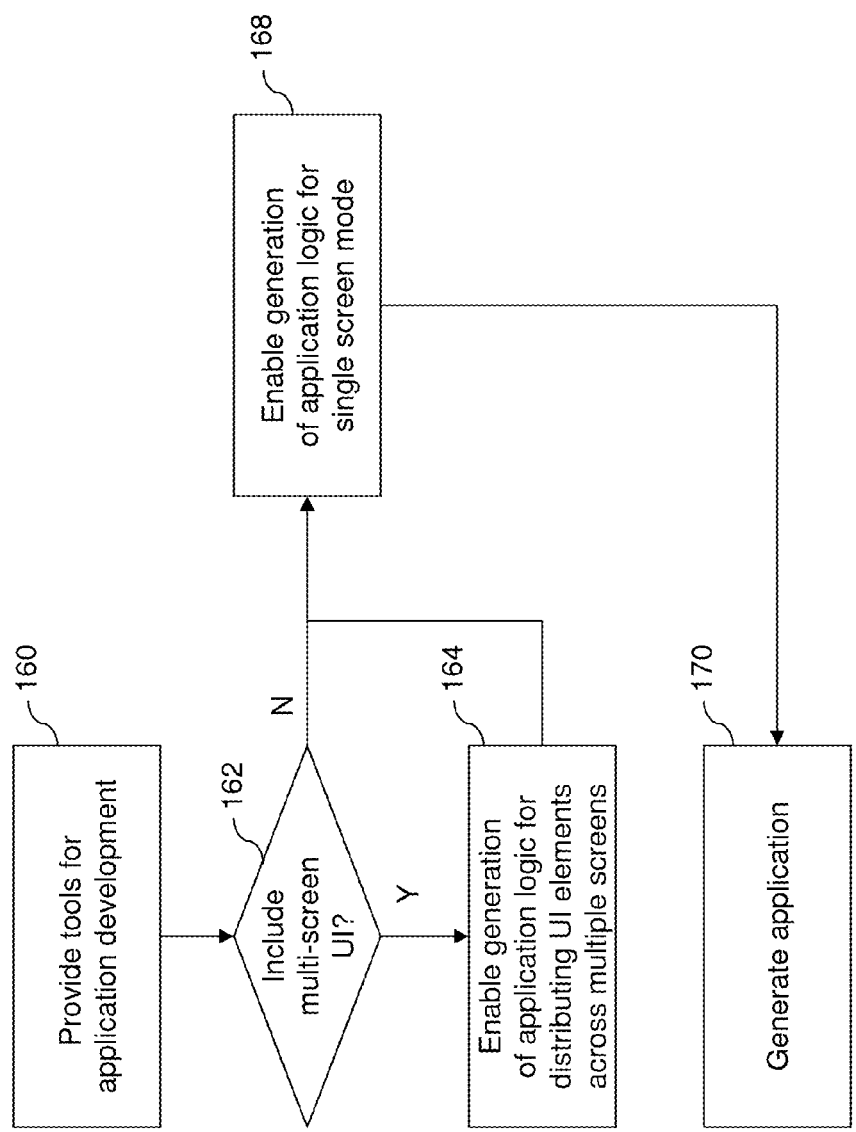
FIG. 14 is a flow chart illustrating an example of a set of computer executable instructions that may be performed in enabling an application developer to generate a mobile device application capable of utilizing multiple screens.

FIG. 14 illustrates an example of a set of computer executable instructions that may be performed in enabling an application developer to generate a mobile device application 38 capable of utilizing multiple screens. At the design stage, the application developer can specify how a UI changes between portrait and landscape orientations, as well as how UI elements are distributed between multiple screens when available. However, by having access to a UI framework 36 described herein, the application 38 can be developed without having specific knowledge of every device that may be paired with the device running the application 38. In other words, while the application developer retains the ability to design and expose the various UI configurations that may be utilized by the application 38, the actual rendering of the UI can be relegated to the UI framework 36 thus minimizing the low level programming.

At 160 the application development environment, e.g., an application toolkit provides the tools for developing the application 38. The tools in this example include the ability to include a multi-screen UI in at least a portion of the application 38. The development toolkit determines at 162 whether or not the application developer wishes to include a multi-screen UI. If so, the toolkit provides one or more tools that enable the application developer to generate application logic for distributing UI elements across the multiple screens at 164. For example, the toolkit may enable the application developer to incorporate a display portion on one screen and a tools portions (e.g., "picker") on the other screen, with the ability to specify which portion is displayed on the larger screen. The toolkit also enables the generation of application logic for a single screen mode at 168, whether or not the application 38 being developed intends on utilizing a second screen when available. The application 38 is then generated for use, e.g., compiled, tested, distributed, etc., at 170.

Accordingly, there is provided a method of displaying a user interface using multiple electronic devices, the method comprising: providing a first user interface framework on a first electronic device having a first display screen; the first user interface framework determining that a second display screen on a second electronic device is available via a connection between the first and second electronic devices; the first user interface framework using application logic from an application on the first electronic device to determine a first user interface portion to be displayed on the first display screen and a second user interface portion to be displayed on the second display screen; and the first user interface framework providing data associated with the second user interface portion to the second electronic device.

There is also provided a computer readable storage medium comprising computer executable instructions for displaying a user interface using multiple electronic devices, the computer executable instructions comprising instructions for: providing a first user interface framework on a first electronic device having a first display screen; the first user interface framework determining that a second display screen on a second electronic device is available via a connection between the first and second electronic devices; the first user interface framework using application logic from an application on the first mobile device to determine a first user interface portion to be displayed on the first display screen and a second user interface portion to be displayed on the second display screen; and the first user interface framework providing data associated with the second user interface portion to the second electronic device.

There is also provided a first electronic device comprising a processor, memory, and a display, the memory comprising computer executable instructions for displaying a user interface using multiple electronic devices, the computer executable instructions comprising instructions for: providing a first user interface framework on the first electronic device; the first user interface framework determining that a second display screen on a second electronic device is available via a connection between the first and second electronic devices; the first user interface framework using application logic from an application on the first electronic device to determine a first user interface portion to be displayed on the first display screen and a second user interface portion to be displayed on the second display screen; and the first user interface framework providing data associated with the second user interface portion to the second electronic device.

Figure 15:
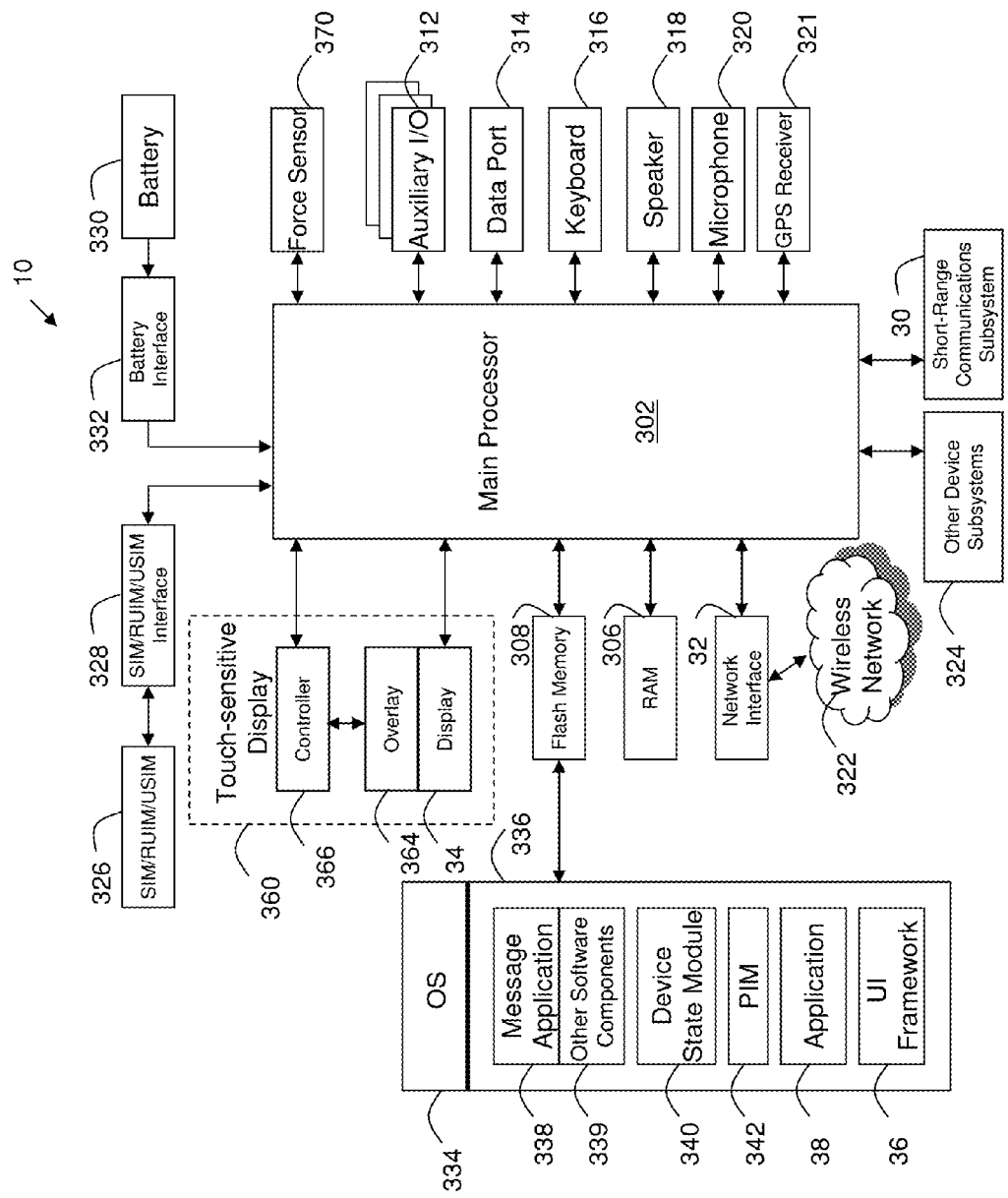
FIG. 15 is a block diagram of an example of a configuration for a mobile device.

Referring to FIG. 15, to further aid in the understanding of the example mobile devices 10, 16 described above, shown therein is a block diagram of an example configuration of the first mobile device 10. The mobile device 10 includes a number of components such as a main processor 302 that controls the overall operation of the mobile device 10. Communication functions, including data and voice communications, are performed through a network interface 32. The network interface 32 receives messages from and sends messages to a wireless network 322. In this example of the mobile device 10, the network interface 32 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the network interface 32 with the wireless network 322 represents one or more different Radio Frequency (RF) channels, operating according to defined protocols specified for GSM/GPRS communications.

The main processor 302 also interacts with additional subsystems such as a Random Access Memory (RAM) 306, a flash memory 308, a touch-sensitive display 360, an auxiliary input/output (I/O) subsystem 312, a data port 314, a keyboard 316 (physical, virtual, or both), a speaker 318, a microphone 320, a GPS receiver 321, short-range communications subsystem 30, and other device subsystems 324. Some of the subsystems of the mobile device 10 perform communication-related functions, whereas other subsystems may provide "resident" or on-device functions. By way of example, the display 34 and the keyboard 316 may be used for both communication-related functions, such as entering a text message for transmission over the wireless network 322, and device-resident functions such as a calculator or task list. In one example, the mobile device 10 can include a non touch-sensitive display in place of, or in addition to the touch-sensitive display 360. For example the touch-sensitive display 360 can be replaced by a display 34 that may not have touch-sensitive capabilities.

The mobile device 10 can send and receive communication signals over the wireless network 322 after required network registration or activation procedures have been completed. Network access is associated with a subscriber or user of the mobile device 10. To identify a subscriber, the mobile device 10 may use a subscriber module component or "smart card" 326, such as a Subscriber Identity Module (SIM), a Removable User Identity Module (RUIM) and a Universal Subscriber Identity Module (USIM). In the example shown, a SIM/RUIM/USIM 326 is to be inserted into a SIM/RUIM/USIM interface 328 in order to communicate with a network.

The mobile device 10 is typically a battery-powered device and includes a battery interface 332 for receiving one or more rechargeable batteries 330. In at least some examples, the battery 330 can be a smart battery with an embedded microprocessor. The battery interface 332 is coupled to a regulator (not shown), which assists the battery 330 in providing power to the mobile device 10. Although current technology makes use of a battery, future technologies such as micro fuel cells may provide the power to the mobile device 10.

The mobile device 10 also includes an operating system 334 and software components 336 to 342, 36, and 38. The operating system 334 and the software components 336 to 342, 36, and 38, that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 342, 36, and 38, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 10 during its manufacture. Software applications may include a message application 338, a device state module 340, a Personal Information Manager (PIM) 342, an application 38, and a UI framework 36. A message application 338 can be any suitable software program that allows a user of the mobile device 10 to send and receive electronic messages, wherein messages are typically stored in the flash memory 308 of the mobile device 10. A device state module 340 provides persistence, i.e. the device state module 340 ensures that important device data is stored in persistent memory, such as the flash memory 308, so that the data is not lost when the mobile device 10 is turned off or loses power. A PIM 342 includes functionality for organizing and managing data items of interest to the user, such as, but not limited to, e-mail, contacts, calendar events, and voice mails, and may interact with the wireless network 322.

Other types of software applications or components 339 can also be installed on the mobile device 10. These software applications 339 can be pre-installed applications (i.e. other than message application 338) or third party applications, which are added after the manufacture of the mobile device 10. Examples of third party applications include games, calculators, utilities, etc.

The additional applications 339 can be loaded onto the mobile device 10 through at least one of the wireless network 322, the auxiliary I/O subsystem 312, the data port 314, the short-range communications subsystem 30, or any other suitable device subsystem 324.

The data port 314 can be any suitable port that enables data communication between the mobile device 10 and another computing device. The data port 314 can be a serial or a parallel port. In some instances, the data port 314 can be a USB port that includes data lines for data transfer and a supply line that can provide a charging current to charge the battery 330 of the mobile device 10.

For voice communications, received signals are output to the speaker 318, and signals for transmission are generated by the microphone 320. Although voice or audio signal output is accomplished primarily through the speaker 318, the display 34 can also be used to provide additional information such as the identity of a calling party, duration of a voice call, or other voice call related information.

The touch-sensitive display 360 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 360 is a capacitive touch-sensitive display which includes a capacitive touch-sensitive overlay 364. The overlay 364 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 34 of the touch-sensitive display 360 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 360. The processor 302 may determine attributes of the touch, including a location of a touch. Touch location data may include an area of contact or a single point of contact, such as a point at or near a center of the area of contact, known as the centroid. A signal is provided to the controller 366 in response to detection of a touch. A touch may be detected from any suitable object, such as a finger, thumb, appendage, or other items, for example, a stylus, pen, or other pointer, depending on the nature of the touch-sensitive display 360. The location of the touch moves as the detected object moves during a touch. One or both of the controller 366 and the processor 302 may detect a touch by any suitable contact member on the touch-sensitive display 360. Similarly, multiple simultaneous touches, are detected.

One or more gestures are also detected by the touch-sensitive display 360. A gesture is a particular type of touch on a touch-sensitive display 360 that begins at an origin point and continues to an end point. A gesture may be identified by attributes of the gesture, including the origin point, the end point, the distance traveled, the duration, the velocity, and the direction, for example. A gesture may be long or short in distance and long or short in duration. Two points of the gesture may be utilized to determine a direction of the gesture.

An example of a gesture is a swipe (also known as a "flick"). A swipe has a single direction. The touch-sensitive overlay 364 may evaluate swipes with respect to the origin point at which contact is initially made with the touch-sensitive overlay 364 and the end point at which contact with the touch-sensitive overlay 364 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 364 to initialize the gesture, a horizontal movement of the detected object from the origin point to an end point towards the right or left side of the touch-sensitive overlay 364 while maintaining continuous contact with the touch-sensitive overlay 364, and a breaking of contact with the touch-sensitive overlay 364. Similarly, a vertical swipe typically comprises an origin point towards the top or bottom of the touch-sensitive overlay 364 to initialize the gesture, a horizontal movement of the detected object from the origin point to an end point towards the bottom or top of the touch-sensitive overlay 364 while maintaining continuous contact with the touch-sensitive overlay 364, and a breaking of contact with the touch-sensitive overlay 364.

Swipes can be of various lengths, can be initiated in various places on the touch-sensitive overlay 364, and need not span the full dimension of the touch-sensitive overlay 364. In addition, breaking contact of a swipe can be gradual in that contact with the touch-sensitive overlay 364 is gradually reduced while the swipe is still underway.

Meta-navigation gestures may also be detected by the touch-sensitive overlay 364. A meta-navigation gesture is a gesture that has an origin point that is outside the display area of the touch-sensitive overlay 364 and that moves to a position on the display area of the touch-sensitive display. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive overlay 364. Thus, two fingers may be utilized for meta-navigation gestures. Further, multi-touch meta-navigation gestures may be distinguished from single touch meta-navigation gestures and may provide additional or further functionality.

In some examples, an optional force sensor 370 or force sensors is disposed in any suitable location, for example, between the touch-sensitive display 360 and a back of the mobile device 10 to detect a force imparted by a touch on the touch-sensitive display 360. The force sensor 370 may be a force-sensitive resistor, strain gauge, piezoelectric or piezoresistive device, pressure sensor, or other suitable device. Force as utilized throughout the specification refers to one or more of force measurements, estimates, and calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

It will be appreciated that any module or component exemplified herein that executes instructions may include or otherwise have access to computer readable media such as storage media, computer storage media, or data storage devices (removable or non-removable or both removable and non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10, or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of displaying a user interface using multiple electronic devices, the method comprising:
    receiving from a first user interface framework on a first electronic device, at a second user interface framework on a second electronic device, data associated with a second user interface portion to be displayed by the second electronic device, the data being received via a connection between the first and second electronic devices, the first electronic device having a first user interface framework and having a first display screen, the first user interface framework handling user interface operations and decisions on behalf of a plurality of different applications on the first electronic device independent of device platform, the first user interface framework having obtained application logic from an application on the first electronic device and used the application logic to determine, for the application, a first user interface portion to be displayed on the first display screen and the second user interface portion to be displayed by the second electronic device; and
    the second user interface framework displaying the second user interface portion on a second display screen of the second electronic device, the second user interface framework handling user interface operations and decisions on behalf of a plurality of different applications on the second electronic device independent of device platform, the second user interface framework comprising a rendering engine operable to communicate with a rendering engine of the first user interface framework for displaying the second user interface portion.

2. The method according to claim 1, further comprising providing one or more screen settings of the second electronic device to the first user interface framework.

3. The method of claim 2, the one or more screen settings comprising at least one screen dimension for generating a combined user interface utilizing the first and second display screens.

4. The method of claim 1, further comprising:
    the second user interface framework indicating to the first user interface framework, an interaction with the second user interface portion to enable an update to be applied to at least one of the first user interface portion and the second user interface portion according to the interaction.

5. The method of claim 4, wherein the application is notified of the interaction and additional application logic is obtained from the application for updating the at least one of the first user interface portion and the second user interface portion on behalf of the application.

6. The method according to claim 1, wherein the first user interface framework comprises a user interface client engine operable to communicate with the rendering engine of the first user interface framework for displaying the first user interface portion.

7. The method of claim 1, the connection between the first and second electronic device being established using any one or more of a short-range communication connection, a mobile network, a local network, an acoustic channel, a computer vision channel, and communicating sensors.

8. The method of claim 1, wherein at least one of the first and second electronic devices is a mobile device.

9. The method of claim 1, the first and second electronic devices comprising different form factors.

10. The method of claim 1, the application logic defining a distribution of user interface elements across multiple display screens, wherein the distribution of user interface elements is independent of a screen size of the first display screen and a screen size of the second display screen.

11. A non-transitory computer readable storage medium comprising computer executable instructions for displaying a user interface using multiple electronic devices, the computer executable instructions comprising instructions for:

receiving from a first user interface framework on a first electronic device, at a second user interface framework on a second electronic device, data associated with a second user interface portion to be displayed by the second electronic device, the data being received via a connection between the first and second electronic devices, the first electronic device having a first user interface framework and having a first display screen, the first user interface framework handling user interface operations and decisions on behalf of a plurality of different applications on the first electronic device independent of device platform, the first user interface framework having obtained application logic from an application on the first electronic device and used the application logic to determine, for the application, a first user interface portion to be displayed on the first display screen and the second user interface portion to be displayed by the second electronic device; and the second user interface framework displaying the second user interface portion on a second display screen of the second electronic device, the second user interface framework handling user interface operations and decisions on behalf of a plurality of different applications on the second electronic device independent of device platform, the second user interface framework comprising a rendering engine operable to communicate with a rendering engine of the first user interface framework for displaying the second user interface portion.

12. The non-transitory computer readable storage medium according to claim 11, further comprising providing one or more screen settings of the second electronic device to the first user interface framework.

13. The non-transitory computer readable storage medium of claim 12, the one or more screen settings comprising at least one screen dimension for generating a combined user interface utilizing the first and second display screens.

14. The non-transitory computer readable storage medium of claim 11, further comprising:

the second user interface framework indicating to the first user interface framework, an interaction with the second user interface portion to enable an update to be applied to at least one of the first user interface portion and the second user interface portion according to the interaction.

15. The non-transitory computer readable storage medium of claim 14, wherein the application is notified of the interaction and additional application logic is obtained from the application for updating the at least one of the first user interface portion and the second user interface portion on behalf of the application.

16. The non-transitory computer readable storage medium according to claim 11, wherein the first user interface framework comprises a user interface client engine operable to communicate with the rendering engine of the first user interface framework for displaying the first user interface portion.

17. The non-transitory computer readable storage medium of claim 11, the connection between the first and second electronic device being established using any one or more of a short-range communication connection, a mobile network, a local network, an acoustic channel, a computer vision channel, and communicating sensors.

18. The non-transitory computer readable storage medium of claim 11, the application logic defining a distribution of user interface elements across multiple display screens, wherein the distribution of user interface elements is independent of a screen size of the first display screen and a screen size of the second display screen.

19. A second electronic device comprising a processor, memory, and a display, the memory comprising computer executable instructions for displaying a user interface using multiple electronic devices, the computer executable instructions comprising instructions for:

receiving from a first user interface framework on a first electronic device, at a second user interface framework on the second electronic device, data associated with a second user interface portion to be displayed by the second electronic device, the data being received via a connection between the first and second electronic devices, the first electronic device having a first user interface framework and having a first display screen, the first user interface framework handling user interface operations and decisions on behalf of a plurality of different applications on the first electronic device independent of device platform, the first user interface framework having obtained application logic from an application on the first electronic device and used the application logic to determine, for the application, a first user interface portion to be displayed on the first display screen and the second user interface portion to be displayed by the second electronic device; and the second user interface framework displaying the second user interface portion on a second display screen of the second electronic device, the second user interface framework handling user interface operations and decisions on behalf of a plurality of different applications on the second electronic device independent of device platform, the second user interface framework comprising a rendering engine operable to communicate with a rendering engine of the first user interface framework for displaying the second user interface portion.

* * * * *